(12) United States Patent
Kitahata et al.

(10) Patent No.: US 11,117,565 B2
(45) Date of Patent: Sep. 14, 2021

(54) HYBRID VEHICLE

(71) Applicant: TOYOTA JIDOSHA KABUSHIKI KAISHA, Toyota (JP)

(72) Inventors: Takeshi Kitahata, Toyota (JP); Tooru Matsubara, Toyota (JP); Kazuyuki Shiiba, Miyoshi (JP); Koichi Okuda, Toyota (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 393 days.

(21) Appl. No.: 16/372,514

(22) Filed: Apr. 2, 2019

(65) Prior Publication Data

US 2019/0299969 A1 Oct. 3, 2019

(30) Foreign Application Priority Data

Apr. 2, 2018 (JP) .............................. JP2018-071214

(51) Int. Cl.
*B60W 20/00* (2016.01)
*B60K 6/40* (2007.10)
(Continued)

(52) U.S. Cl.
CPC ............. *B60W 20/00* (2013.01); *B60K 6/387* (2013.01); *B60K 6/40* (2013.01); *B60K 6/547* (2013.01); *B60W 10/02* (2013.01); *B60W 10/06* (2013.01); *B60W 10/08* (2013.01); *B60W 2510/0657* (2013.01); *B60W 2510/083* (2013.01); *B60W 2520/10* (2013.01); *B60W 2710/021* (2013.01);
(Continued)

(58) Field of Classification Search
None
See application file for complete search history.

(56) References Cited

U.S. PATENT DOCUMENTS 5,979,158 A * 11/1999 Kaiser ................... F02D 41/062
60/274
6,688,411 B2 * 2/2004 Boggs ................... F02D 41/405
180/65.235
(Continued)

FOREIGN PATENT DOCUMENTS

CN 101033696 A * 9/2007 ............ B60W 10/08
EP 1782990 A2 * 5/2007 ............ B60W 10/06
(Continued)

*Primary Examiner* — Dirk Wright
(74) *Attorney, Agent, or Firm* — Oliff PLC

(57) ABSTRACT

A hybrid vehicle with an engine and a rotary machine each coupled to a drive wheel in a power transmittable manner, comprises: an electronic control device that makes the rotary machine output a starting-time compensation torque to compensate a drop in a drive torque caused in a starting process of the engine in addition to a running torque when the engine is started while the vehicle is in a running state in which the drive torque is generated by the rotary machine and the engine is in a stopped state. The electronic control device starts the engine such that a starting-time inertia torque that is generated according to starting of the engine and causes the drop in the drive torque is made smaller when a torque margin of the rotary machine which is applied to the starting-time compensation torque is relatively small than when the torque margin is relatively large.

15 Claims, 10 Drawing Sheets

(51) Int. Cl.
  B60K 6/547 (2007.10)
  B60K 6/387 (2007.10)
  B60W 10/06 (2006.01)
  B60W 10/08 (2006.01)
  B60W 10/02 (2006.01)

(52) U.S. Cl.
  CPC .............. *B60W 2710/0661* (2013.01); *B60W 2710/083* (2013.01); *B60Y 2200/92* (2013.01); *B60Y 2300/192* (2013.01)

(56) References Cited

U.S. PATENT DOCUMENTS

| | | | |
|---|---|---|---|
| 6,769,400 B1 * | 8/2004 | Ament | F02N 11/04 |
| | | | 123/399 |
| 6,931,318 B2 * | 8/2005 | Kaita | B60W 10/08 |
| | | | 701/113 |
| 7,146,958 B2 * | 12/2006 | Asakawa | B60W 10/06 |
| | | | 123/179.16 |
| 7,610,892 B2 * | 11/2009 | Butcher | B60W 10/06 |
| | | | 123/179.3 |
| 8,798,839 B2 * | 8/2014 | Yamanaka | B60W 10/02 |
| | | | 701/22 |
| 8,838,317 B2 * | 9/2014 | Okuda | B60W 20/20 |
| | | | 701/22 |
| 9,393,950 B2 * | 7/2016 | Yamazaki | B60W 10/06 |
| 9,586,469 B2 * | 3/2017 | Orita | B60W 20/40 |
| 2011/0040432 A1 * | 2/2011 | Kaltenbach | B60K 6/365 |
| | | | 701/22 |

FOREIGN PATENT DOCUMENTS

| | | | | |
|---|---|---|---|---|
| EP | 2685083 A2 * | 1/2014 | ............ | B60W 10/08 |
| JP | 2013-043570 A | 3/2013 | | |
| JP | 2013-163421 A | 8/2013 | | |
| WO | WO-2009109831 A1 * | 9/2009 | ................ | B60K 6/38 |
| WO | WO-2012056855 A1 * | 5/2012 | ........... | B60L 15/2045 |
| WO | WO-2015052760 A1 * | 4/2015 | ............ | B60W 10/02 |

\* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| SIMULATED GEAR POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

HYBRID VEHICLE

This application claims priority from Japanese Patent Application No. 2018-071214 filed on Apr. 2, 2018, the disclosure of which is herein incorporated by reference in its entirety.

FIELD OF THE ART

The present invention relates to a hybrid vehicle including an engine and a rotary machine coupled to a drive wheel in a power transmittable manner.

BACKGROUND ART

A hybrid vehicle including an engine and a rotary machine coupled to a drive wheel in a power transmittable manner is well-known. Such a hybrid vehicle is, for example, a hybrid vehicle described in Patent Document 1. This Patent Document 1 discloses that a clutch that connects and disconnects a power transmission path between the engine and the drive wheel is provided, and when a running state where a drive torque is generated by the rotary machine while the engine is stopped is switched into a running state where the engine is operated, by connecting the power transmission path while gradually increasing a torque capacity of the clutch, a rotation speed of the engine is increased to start the engine. In addition, Patent Document 1 discloses that by such engine starting control, a drop in the drive torque occurring in the engine starting process is suppressed.

PRIOR ART DOCUMENT

Patent Document

[PATENT DOCUMENT 1] Japan Patent Publication No. 2013-43570

SUMMARY OF THE INVENTION

Technical Problem

It is possible that, by outputting a starting-time compensation torque being a torque to compensate a drop in drive torque occurring in a starting process of the engine by the rotary machine, the drop is suppressed and a starting shock is reduced. When a starting-time compensation torque is output by the rotary machine in a starting process of the engine, starting of the engine can be more quickly completed than in the case disclosed in Patent Document 1 where a control is performed to gradually increase the torque capacity of the clutch. However, the above-described starting-time compensation torque must be output by the rotary machine in addition to a running torque, so that depending on a magnitude of the running torque that has already been generated by the rotary machine, there is a possibility that a torque margin being a margin of the torque of the rotary machine capable of being used for the starting-time compensation torque is insufficient for the drop in the drive torque, and the starting shock may not be properly reduced.

The present invention was made in view of the above-described circumstances, and an object thereof is to provide a hybrid vehicle capable of properly reducing a starting shock when a starting-time compensation torque is output by the rotary machine in a starting process of the engine.

Solution to Problem

To achieve the above object, a first aspect of the present invention provides a hybrid vehicle (a) with an engine and a rotary machine each coupled to a drive wheel in a power transmittable manner, comprising: (b) an electronic control device that makes the rotary machine output a starting-time compensation torque to compensate a drop in a drive torque caused in a starting process of the engine in addition to a running torque when the engine is started while the vehicle is in a running state in which the drive torque is generated by the rotary machine and the engine is in a stopped state, wherein (c) the electronic control device starts the engine such that a starting-time inertia torque that is generated according to starting of the engine and causes the drop in the drive torque is made smaller (i.e. relatively small) in a case where a torque margin of the rotary machine which is applied to the starting-time compensation torque is relatively small than in a case where the torque margin is relatively large.

A second aspect of the present invention provides the hybrid vehicle recited in the first aspect of the invention, wherein the electronic control device makes the starting-time inertia torque smaller by making longer a time from the start of starting of the engine to completion of starting.

A third aspect of the present invention provides the hybrid vehicle recited in the first aspect of the invention, wherein the electronic control device makes smaller the starting-time inertia torque by making smaller a rotation speed change rate of the engine in a starting process of the engine.

A fourth aspect of the present invention provides the hybrid vehicle recited in the third aspect of the invention, wherein the electronic control device makes larger (i.e. relatively large) a rotation speed change rate of the engine when the rotation speed of the engine is in a predetermined resonance region than when the rotation speed of the engine is in a region other than the predetermined resonance region.

A fifth aspect of the present invention provides the hybrid vehicle recited in the third aspect of the invention further comprising: a transmission constituting a part of a power transmission path between the engine and the drive wheel, wherein the electronic control device makes smaller the rotation speed change rate of the engine when a transmission gear ratio of the transmission is relatively large than when the transmission gear ratio is relatively small.

A sixth aspect of the present invention provides the hybrid vehicle recited in the third aspect of the invention, wherein the electronic control device makes smaller the rotation speed change rate of the engine when a vehicle speed is relatively low than when the vehicle speed is relatively high.

A seventh aspect of the present invention provides the hybrid vehicle recited in the third aspect of the invention, wherein the electronic control device makes smaller the rotation speed change rate of the engine during running in a predetermined first running mode in which a frequency of starting the engine is relatively high than during running in a predetermined second running mode in which the frequency of starting the engine is relatively low.

An eighth aspect of the present invention provides the hybrid vehicle recited in the first aspect of the invention, wherein the electronic control device changes the starting-time inertia torque according to a change in the torque margin of the rotary machine in a starting process of the engine.

A ninth aspect of the present invention provides the hybrid vehicle recited in the first aspect of the invention, wherein the electronic control device starts the engine by ignition starting in which the engine is rotated by combusting in a predetermined cylinder while the engine is stopping rotating, and the electronic control device changes the starting-time inertia torque according to a change in an output torque of the engine in a starting process of the engine by the ignition starting.

A tenth aspect of the present invention provides the hybrid vehicle recited in the ninth aspect of the invention, further comprising: a damper coupled to a rotary shaft of the engine, wherein the electronic control device detects an output torque of the engine based on a phase difference between the rotary shaft of the engine and the damper.

An eleventh aspect of the present invention provides the hybrid vehicle recited in the ninth aspect of the invention, wherein the electronic control device detects the output torque of the engine based on a rotation speed change rate of the engine.

A twelfth aspect of the present invention provides the hybrid vehicle recited in any one of the first to fourth, sixth to eighth aspects of the invention, further comprising: an electric shifting mechanism including a differential mechanism to which the engine is coupled in a power transmittable manner and a first rotary machine coupled to the differential mechanism in a power transmittable manner, wherein a differential state of the differential mechanism is controlled according to control of an operating condition of the first rotary machine, and wherein the rotary machine is a second rotary machine coupled to a power transmission path between the electric shifting mechanism and the drive wheel in a power transmittable manner, and the electronic control device starts the engine by increasing a rotation speed of the engine by the first rotary machine.

A thirteenth aspect of the present invention provides the hybrid vehicle recited in the fifth aspect of the invention, further comprising: an electric shifting mechanism including a differential mechanism to which the engine is coupled in a power transmittable manner and a first rotary machine coupled to the differential mechanism in a power transmittable manner, wherein a differential state of the differential mechanism is controlled according to control of an operating condition of the first rotary machine, and wherein the rotary machine is a second rotary machine coupled to a power transmission path between the electric shifting mechanism and the drive wheel in a power transmittable manner, the transmission is a mechanical shifting mechanism constituting a part of a power transmission path between the electric shifting mechanism and the drive wheel, and the electronic control device starts the engine by increasing a rotation speed of the engine by the first rotary machine.

A fourteenth aspect of the present invention provides the hybrid vehicle recited in any one of the ninth to eleventh aspects of the invention, further comprising: an electric shifting mechanism including a differential mechanism to which the engine is coupled in a power transmittable manner and a first rotary machine coupled to the differential mechanism in a power transmittable manner, wherein a differential state of the differential mechanism is controlled according to control of an operating condition of the first rotary machine, and wherein the rotary machine is a second rotary machine coupled to a power transmission path between the electric shifting mechanism and the drive wheel in a power transmittable manner, the electronic control device is configured to start the engine by increasing a rotation speed of the engine by the first rotary machine, and the electronic control device makes smaller the starting-time inertia torque by starting the engine mainly by the ignition starting.

A fifteenth aspect of the present invention provides the hybrid vehicle recited in the first aspect of the invention, further comprising: a clutch that connects and disconnects a power transmission path between the engine and the drive wheel; and a transmission constituting a part of a power transmission path between the clutch and the drive wheel, wherein the rotary machine is coupled to the power transmission path between the clutch and the drive wheel in a power transmittable manner, and the electronic control device starts the engine by increasing a rotation speed of the engine by controlling the clutch in a released state into an engaged state.

Advantageous Effects of Invention

According to the first aspect of the invention, when the engine is started while the vehicle is in the running state in which the drive torque is generated by the rotary machine, the engine is started so as to make smaller the starting-time inertia torque in response to starting of the engine when a torque margin of the rotary machine which is applied to the starting-time compensation torque to be output by the rotary machine in addition to the running torque is relatively small than in the case where the torque margin is relatively large, so that when the torque margin of the rotary machine is small, a drop in the drive torque to be caused by the starting-time inertia torque is made smaller. Accordingly, even when the torque margin of the rotary machine is small, a drop in the drive torque can be compensated. Therefore, when the rotary machine is made to output the starting-time compensation torque in the starting process of the engine, a starting shock can be properly reduced.

According to the second aspect of the invention, the starting-time inertia torque is made smaller by making longer the time from the start of starting of the engine to completion of starting, so that when the torque margin of the rotary machine is small, a drop in the drive torque to be caused by the starting-time inertia torque can be properly reduced.

According to the third aspect of the invention, the starting-time inertia torque is made smaller by making smaller the rotation speed change rate of the engine in the starting process of the engine, so that when the torque margin of the rotary machine is small, a drop in the drive torque to be caused by the starting-time inertia torque is properly reduced.

According to the fourth aspect of the invention, when the rotation speed of the engine is in the predetermined resonance region, the rotation speed change rate of the engine is set to be larger than when the rotation speed of the engine is in a region other than the predetermined resonance region, so that when the starting-time inertia torque is made smaller by making smaller the rotation speed change rate of the engine in the starting process of the engine, occurrence of resonance in the power transmission path due to an explosion variation in the rotation speed of the engine is avoided or suppressed.

According to the fifth aspect of the invention, when the transmission gear ratio of the transmission is relatively large, the rotation speed change rate of the engine is made smaller than when the transmission gear ratio is relatively small, so that in response to the phenomenon in which the starting-time inertia torque is amplified and transmitted to the drive wheels as the transmission gear ratio of the transmission is larger, a drop in the drive torque to be caused by the starting-time inertia torque is properly reduced.

According to the sixth aspect of the invention, when the vehicle speed is relatively low, the rotation speed change rate of the engine is made smaller than when the vehicle speed is relatively high, so that as the vehicle speed goes to the lower vehicle speed side where a starting shock is easily felt, a drop in the drive torque to be caused by the starting-time inertia torque is made smaller.

According to the seventh aspect of the invention, the rotation speed change rate of the engine is made smaller during running in the predetermined first running mode than during running in the predetermined second running mode, so that a driver's feeling of strangeness/sense of discomfort due to the high frequency of occurrence of the starting shock can be prevented or suppressed.

According to the eighth aspect of the invention, the starting-time inertia torque is changed in accordance with a change in torque margin of the rotary machine in the starting process of the engine, so that in response to the phenomenon in which an influence of the torque margin change on the starting shock increases when an aspect in which the starting-time inertia torque is made smaller in accordance with a torque margin of the rotary machine is employed, such an influence can be reduced.

According to the ninth aspect of the invention, the starting-time inertia torque is changed according to the change in the output torque of the engine in the starting process of the engine by ignition starting, so that in response to the phenomenon in which the starting shock is varied according to a variation in the output torque of the engine in the starting process of the engine by ignition starting, the starting shock can be properly reduced.

According to the tenth aspect of the invention, the output torque of the engine is detected based on the phase difference between the rotary shaft of the engine and the damper, so that a variation in the output torque of the engine in the starting process of the engine by ignition starting is properly detected, and a starting shock can be properly reduced.

According to the eleventh aspect of the invention, the output torque of the engine is detected based on the rotation speed change rate of the engine, so that a variation in the output torque of the engine in the starting process of the engine by ignition starting is properly detected, and a starting shock can be properly reduced.

According to the twelfth aspect of the invention, in the hybrid vehicle that includes the electric shifting mechanism and starts the engine by increasing the rotation speed of the engine by the first rotary machine, a starting shock can be properly reduced when a starting-time compensation torque is output by the rotary machine in a starting process of the engine.

According to the thirteenth aspect of the invention, in the hybrid vehicle that includes the electric shifting mechanism and the mechanical shifting mechanism in series, and starts the engine by increasing the rotation speed of the engine by the first rotary machine, a starting shock can be properly reduced when a starting-time compensation torque is output by the rotary machine in a starting process of the engine.

According to the fourteenth aspect of the invention, in the hybrid vehicle that includes the electric shifting mechanism, and is capable of starting the engine by the first rotary machine as well as starting the engine by ignition starting, since the starting-time inertia torque is made small by starting the engine mainly by ignition starting, a starting shock can be properly reduced when a starting-time compensation torque is output by the rotary machine in a starting process of the engine.

According to the fifteenth aspect of the invention, in the hybrid vehicle that includes the clutch to connect and disconnect the power transmission path between the engine and the drive wheel, the transmission constituting the part of the power transmission path between the clutch and the drive wheel and the rotary machine coupled to the transmission path between the clutch and the drive wheel in a power transmittable manner, and starts the engine by increasing the rotation speed of the engine by controlling the clutch in the released state into the engaged state, a starting shock can be properly reduced when a starting-time compensation torque is output by the rotary machine in a starting process of the engine.

BRIEF DESCRIPTION OF DRAWINGS

FIG. 11 shows an example different from the flowchart of FIG. 9.

DESCRIPTION OF THE EMBODIMENT

In an embodiment of the present invention, a transmission gear ratio of the transmission is obtained by dividing "rotation speed of input side rotating member" by "rotation speed of output side rotating member". A relatively small transmission gear ratio corresponds to a high vehicle-speed side of this transmission gear ratio. A relatively large transmission gear ratio corresponds to a low vehicle-speed side of the transmission gear ratio. For example, the lowest-side transmission gear ratio is a transmission gear ratio at the lowest vehicle-speed side where the vehicle speed is lowest, and is a maximum transmission gear ratio at which the transmission gear ratio is largest.

The engine is, for example, a publicly-known internal combustion engine such as a gasoline engine or a diesel engine that generates power by combustion of a fuel.

Hereinafter, examples of the present invention are described in detail with reference to the drawings.

Example 1

Figure 1:
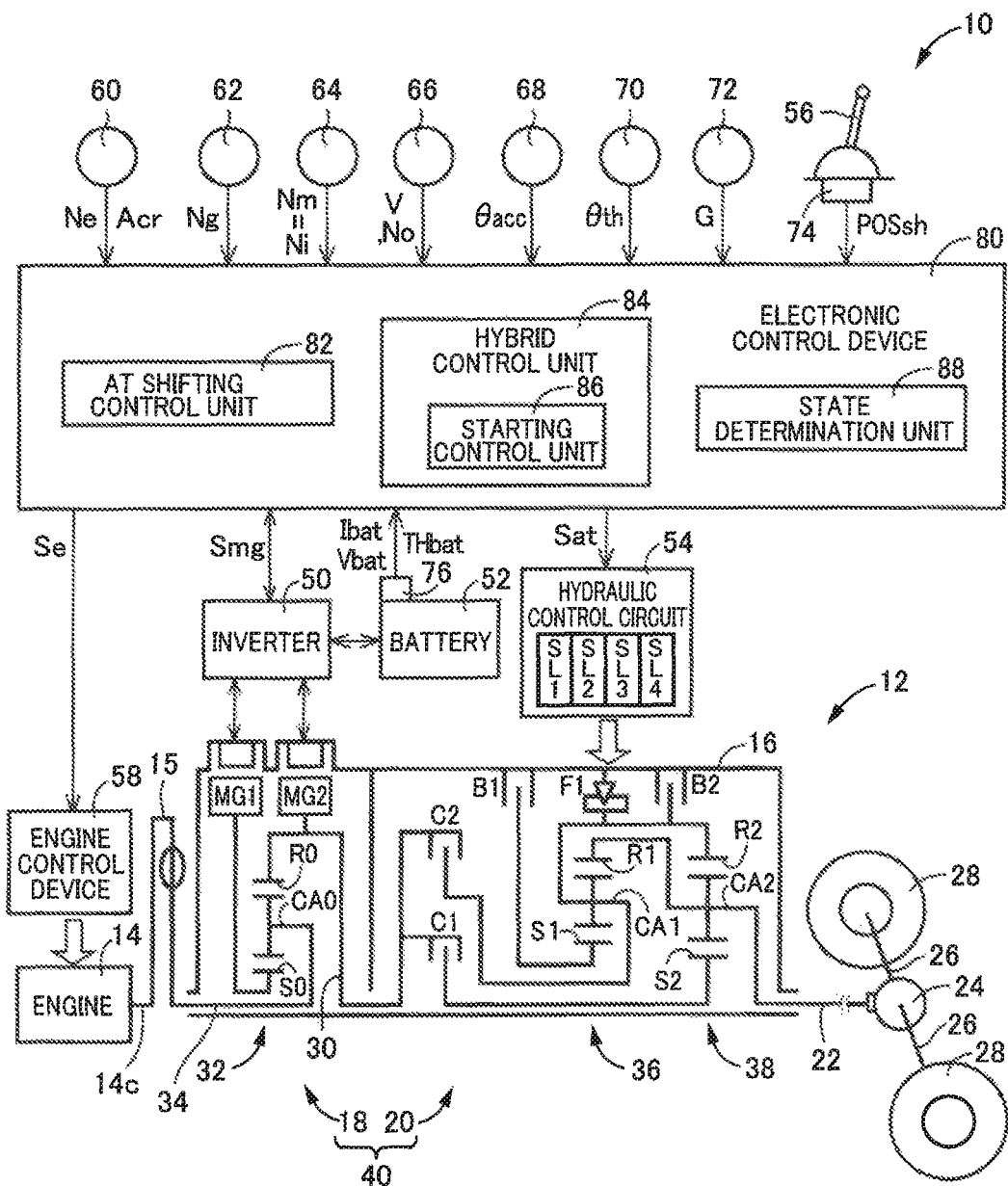
FIG. 1 is a diagram describing a schematic configuration of a vehicle drive device installed in a hybrid vehicle to which the present invention is applied, and describes an essential portion of a control function and a control system for various controls in the hybrid vehicle.

FIG. 1 is a diagram describing a schematic configuration of a vehicle drive device 12 installed in a hybrid vehicle 10 to which the present invention is applied, and describes an essential portion of a control system for various controls in the hybrid vehicle 10. In FIG. 1, the vehicle drive device 12 includes an engine 14 functioning as a power source, and a damper 15 coupled to a crankshaft 14c being a rotary shaft of the engine 14. In addition, the vehicle drive device 12 includes an electric continuously variable transmission unit 18 and a mechanical stepped transmission unit 20, etc., disposed in series on a common axis inside a transmission case 16 as a non-rotatable member attached to a vehicle body. The electric continuously variable transmission unit 18 is coupled to the engine 14 via the damper 15, etc. The mechanical stepped transmission unit 20 is coupled to an output side of the electric continuously variable transmission unit 18. The common axis is an axis of the crankshaft 14c being a rotary shaft of the engine 14, or the like. Further, the vehicle drive device 12 includes a differential gear device 24 coupled to an output shaft 22 being an output rotating member of the mechanical stepped transmission unit 20, and a pair of axles 26 coupled to the differential gear device 24, etc. In the vehicle drive device 12, powers output from the engine 14 and a second rotary machine MG2 described later are transmitted to the mechanical stepped transmission unit 20, and transmitted from the mechanical stepped transmission unit 20 to drive wheels 28 of the hybrid vehicle 10 via the differential gear device 24, etc. The vehicle drive device 12 is preferably used for, for example, an FR type hybrid vehicle 10. Hereinafter, the hybrid vehicle 10 is referred to as a vehicle 10, the transmission case 16 is referred to as a case 16, the electric continuously variable transmission unit 18 is referred to as a continuously variable transmission unit 18, and the mechanical stepped transmission unit 20 is referred to as a stepped transmission unit 20. Power is synonymous with a torque and a force when not particularly distinguished. The continuously variable transmission unit 18 and the stepped transmission unit 20, etc., are configured substantially symmetrically about the common axis, and in FIG. 1, a lower half below the axis is not shown.

The engine 14 is a power source for running of the vehicle 10, coupled to the drive wheels 28 in a power transmittable manner. In this engine 14, an engine torque Te being an output torque of the engine 14 is controlled according to control of at least one of operating conditions such as a throttle valve opening θth or intake air volume, fuel supply amount, ignition time, etc., by an electronic control device 80 described later. In the present example, the engine 14 is coupled to the continuously variable transmission unit 18 without a fluid type transmission device such as a torque converter and a fluid coupling.

The continuously variable transmission unit 18 includes a first rotary machine MG1, a differential mechanism 32 as a power dividing mechanism to mechanically divide power of the engine 14 for the first rotary machine MG1 and an intermediate transmission member 30 being an output rotating member of the continuously variable transmission unit 18, and a second rotary machine MG2 coupled to the intermediate transmission member 30 in a power transmittable manner. The continuously variable transmission unit 18 is an electric continuously variable transmission in which a differential state of the differential mechanism 32 is controlled according to a control of operating conditions of the first rotary machine MG1. The first rotary machine MG1 corresponds to a differential rotary machine, and the second rotary machine MG2 is a rotary machine functioning as a power source and corresponds to a running drive rotary machine. The second rotary machine MG2 is a rotary machine coupled to the drive wheels 28 in a power transmittable manner.

The first rotary machine MG1 and the second rotary machine MG2 are rotary electric machines having a function as an electric motor (motor) and a function as a power generator (generator), and are so-called motor generators. The first rotary machine MG1 and the second rotary machine MG2 are respectively connected to a battery 52 as an electric storage device installed in the vehicle 10 via an inverter 50 installed in the vehicle 10, and according to a control of the inverter 50 by the electronic control device 80 described later, an MG1 torque Tg and an MG2 torque Tm being output torques of the respective first rotary machine MG1 and second rotary machine MG2 are controlled. Concerning the output torques of the rotary machines, a positive torque being an acceleration side is a power running torque, and a negative torque being a deceleration side is a regenerative torque. The battery 52 is an electric storage device that provides and receives electric power to and from each of the first rotary machine MG1 and the second rotary machine MG2.

The differential mechanism 32 consists of a single pinion type planetary gear drive, and includes a sun gear S0, a carrier CA0, and a ring gear R0. To the carrier CA0, the engine 14 is coupled in a power transmittable manner via a coupling shaft 34 coupled to the damper 15, and to the sun gear S0, the first rotary machine MG1 is coupled in a power transmittable manner, and to the ring gear R0, the second rotary machine MG2 is coupled in a power transmittable manner. In the differential mechanism 32, the carrier CA0 functions as an input element, the sun gear S0 functions as a reaction force element, and the ring gear R0 functions as an output element.

The stepped transmission unit 20 is a mechanical shifting mechanism constituting a part of a power transmission path between the intermediate transmission member 30 and the drive wheels 28, that is, a mechanical shifting mechanism constituting a part of the power transmission path between the continuously variable transmission unit 18 and the drive wheels 28. The intermediate transmission member 30 functions as an input rotating member of the stepped transmission unit 20 as well. The engine 14 is coupled to an input side of the continuously variable transmission unit 18, so that the stepped transmission unit 20 is a transmission constituting a part of the power transmission path between the engine 14 and the drive wheels 28. The stepped transmission unit 20 is, for example, a publicly-known planetary gear type automatic transmission that includes a plurality of pairs of planetary gear drives each consisting of a first planetary gear drive 36 and a second planetary gear drive 38, and a plurality of engagement devices of a one-way clutch F1, a clutch C1, a clutch C2, a brake B1, and a brake B2. Hereinafter, the clutch C1, the clutch C2, the brake B1, and the brake B2 are simply referred to as engagement devices CB, unless they are not particularly distinguished.

The engagement devices CB are hydraulic frictional engagement devices consisting of a multi-plate or single-plate type clutch and brake to be pressed by a hydraulic actuator, and a band brake to be tightened by a hydraulic actuator, etc. In the engagement devices CB, by changing engagement torques Tcb being torque capacities of the respective engagement devices according to respective engagement hydraulic pressures PRcb being regulated engagement pressures of the engagement devices CB to be respectively output from solenoid valves SL1 to SL4, etc., inside a hydraulic control circuit 54 provided in the vehicle 10, operating states of the engagement devices CB being engaged and released states are respectively switched. Between the intermediate transmission member 30 and the output shaft 22, to transmit, for example, an AT input torque Ti being an input torque to be input into the stepped transmission unit 20 without slipping the engagement devices CB, engagement torques Tcb are needed by which assigned torques assigned to the engagement devices CB, being transmission torques that the respective engagement devices CB must take charge of with respect to the AT input torque Ti, are obtained. However, concerning the engagement torques Tcb by which transmission torques are obtained, even when the engagement torques Tcb are increased, the transmission torques do not increase. That is, the engagement torques Tcb correspond to maximum torques that the engagement devices CB can transmit, and the transmission torques correspond to torques that the engagement devices CB transmit in actuality. Preventing the engagement devices CB from slipping is equivalent to preventing a rotation speed difference among the engagement devices CB. The engagement torques Tcb (or transmission torques) and the engagement hydraulic pressures PRcb bear a substantially proportional relationship except for a region in which, for example, an engagement hydraulic pressure PRcb necessary for packing of the engagement devices CB is supplied.

Basically, the one-way clutch F1 is automatically engaged in a driving state where the AT input torque Ti is a positive torque, and on the other hand, the one-way clutch is released in a driven state where the AT input torque Ti is a negative torque.

In the stepped transmission unit 20, respective rotational elements of the first planetary gear drive 36 and the second planetary gear drive 38 are partially coupled to each other directly or indirectly via the engagement devices CB and the one-way clutch F1, and coupled to the intermediate transmission member 30, the case 16, or the output shaft 22. The respective rotational elements of the first planetary gear drive 36 are a sun gear S1, a carrier CA1, and a ring gear R1, and the respective rotational elements of the second planetary gear drive 38 are a sun gear S2, a carrier CA2, and a ring gear R2.

The stepped transmission unit 20 is a stepped automatic transmission in which any gear position among a plurality of shifting positions (referred to as gear positions as well) having different transmission gear ratios (referred to as gear ratios as well) γat (=AT input rotation speed Ni/output rotation speed No) is formed according to engagement of, for example, predetermined engagement devices being any of the plurality of engagement devices. That is, the stepped transmission unit 20 is a stepped automatic transmission in which a gear position is switched in response to engagement of any of the plurality of engagement devices. Switching the gear position of the stepped transmission unit 20 is execution of shifting of the stepped transmission unit 20. In the present example, the gear position formed in the stepped transmission unit 20 is referred to as an AT gear position. The AT input rotation speed Ni is an input rotation speed of the stepped transmission unit 20 being a rotation speed of an input rotating member of the stepped transmission unit 20, and is equivalent in value to a rotation speed of the intermediate transmission member 30, and equivalent in value to an MG2 rotation speed Nm being a rotation speed of the second rotary machine MG2. The AT input rotation speed Ni can be represented by the MG2 rotation speed Nm. The output rotation speed No is a rotation speed of the output shaft 22 being an output rotation speed of the stepped transmission unit 20, and is also an output rotation speed of a composite transmission being an overall transmission combining the continuously variable transmission unit 18 and the stepped transmission unit 20.

Figures 2, 3:
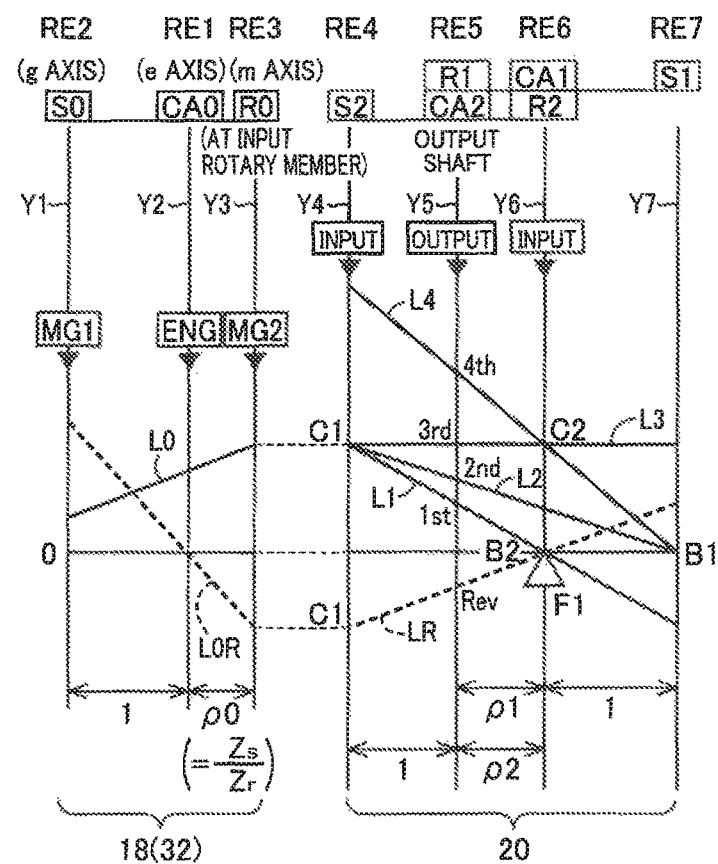
FIG. 2 is an operation chart describing a relationship between a shifting operation of a mechanical stepped transmission unit exemplified in FIG. 1 and combinations of operations of engagement devices to be used for the shifting operation.
FIG. 3 is an alignment chart showing a relative relationship among rotation speeds of respective rotational elements in an electric continuously variable transmission unit and the mechanical stepped transmission unit.

In the stepped transmission unit 20, for example, as shown in the engaging operation chart in FIG. 2, as the plurality of AT gear positions, four AT gear positions for forward running, including an AT first speed gear position ("1st" in the drawing) to an AT fourth speed gear position ("4th" in the drawing) are formed. A transmission gear ratio γat of the AT first speed gear position is largest, and as the AT gear position goes to the higher side, the smaller the transmission gear ratio γat becomes. The engaging operation chart in FIG. 2 summarizes the relationships between the respective AT gear positions and the respective operating states of the plurality of engagement devices. That is, the engaging operation chart in FIG. 2 summarizes the relationships between the respective AT gear positions and predetermined engagement devices being engagement devices to be engaged for the respective AT gear positions. In FIG. 2, "O" denotes engagement, "Δ" denotes engagement at the time of engine braking or coast downshifting of the stepped transmission unit 20, and a blank denotes release. The one-way clutch F1 is provided in parallel to the brake B2 that establishes the AT first speed gear position, so that the brake B2 does not need to be engaged when starting running or accelerating. Coast downshifting of the stepped transmission unit 20 is downshifting judged during deceleration in response to, for example, a turned-off state of the accelerator where an accelerator opening θacc is zero or substantially zero. By releasing all of the plurality of engagement devices, the stepped transmission unit 20 is turned into a neutral state where no AT gear position is formed, that is, a neutral state where power transmission is blocked. Judging downshifting is requesting downshifting.

In the stepped transmission unit 20, in response to a driver's (that is, a person who drives the vehicle) accelerator operation and a vehicle speed V, etc., by controlling release of a releasing-side engagement device of the predetermined engagement devices forming an AT gear position before shifting and engagement of an engaging-side engagement device of the predetermined engagement devices forming an AT gear position after shifting by the electronic control device 80 described later, an AT gear position to be formed is switched, that is, the plurality of AT gear positions are selectively formed. That is, in shifting control of the stepped transmission unit 20, so-called clutch-to-clutch shifting is executed in which, for example, shifting is executed by changing holding on any of the engagement devices CB, that is, switching between engagement and release of the engagement devices CB. For example, in downshifting from the AT second speed gear position to the AT first speed gear position, as shown in the engaging operation chart in FIG. 2, the brake B1 as a releasing-side engagement device is released, and the brake B2 as an engaging-side engagement device is engaged. At this time, a releasing transient hydraulic pressure of the brake B1 and an engaging transient hydraulic pressure of the brake B2 are regulated and controlled. The releasing-side engagement device is an engagement device relating to shifting of the stepped transmission unit 20 among the engagement devices CB, and is an engagement device to be controlled to be released in shifting transition of the stepped transmission unit 20. The engaging-side engagement device is an engagement device relating to shifting of the stepped transmission unit 20 among the engagement devices CB, and is an engagement device to be controlled to be engaged in shifting transition of the stepped transmission unit 20. 2→1 downshifting can also be executed by automatically engaging the one-way clutch F1 by releasing the brake B1 as a releasing-side engagement device relating to 2→1 downshifting. In the present example, for example, downshifting from the AT second speed gear position to the AT first speed gear position is represented as 2→1 downshifting. The same applies to other upshifting and downshifting.

FIG. 3 is an alignment chart showing a relative relationship among rotation speeds of the respective rotational elements in the continuously variable transmission unit 18 and the stepped transmission unit 20. In FIG. 3, three vertical lines Y1, Y2, and Y3 corresponding to the three rotational elements of the differential mechanism 32 constituting the continuously variable transmission unit 18 are respectively, in order from the left side, a g axis representing a rotation speed of the sun gear S0 corresponding to a second rotational element RE2, an e axis representing a rotation speed of the carrier CA0 corresponding to a first rotational element RE1, and an m axis representing a rotation speed of the ring gear R0 (that is, an input rotation speed of the stepped transmission unit 20) corresponding to a third rotational element RE3. Four vertical lines Y4, Y5, Y6, and Y7 of the stepped transmission unit 20 are respectively, in order from the left side, an axis representing a rotation speed of the sun gear S2 corresponding to a fourth rotational element RE4, an axis representing a rotation speed of the ring gear R1 and the carrier CA2 coupled to each other (that is, a rotation speed of the output shaft 22) corresponding to a fifth rotational element RE5, an axis representing a rotation speed of the carrier CA1 and the ring gear R2 coupled to each other corresponding to a sixth rotational element RE6, and an axis representing a rotation speed of the sun gear S1 corresponding to a seventh rotational element RE7. Intervals of the vertical lines Y1, Y2, and Y3 are determined according to a gear ratio p0 of the differential mechanism 32. Intervals of the vertical lines Y4, Y5, Y6, and Y7 are determined according to respective gear ratios p1 and p2 of the first and second planetary gear drives 36 and 38. In the relationship among the vertical axes in the alignment chart, when an interval between the sun gear and the carrier is set to an interval corresponding to "1", an interval between the carrier and the ring gear is set to an interval corresponding to a gear ratio ρ (=the number Zs of teeth of the sun gear/the number Zr of teeth of the ring gear) of the planetary gear drive.

Expressing by use of the alignment chart in FIG. 3, in the differential mechanism 32 of the continuously variable transmission unit 18, the engine 14 (refer to "ENG" in the drawing) is coupled to the first rotational element RE1, the first rotary machine MG1 (refer to "MG1" in the drawing) is coupled to the second rotational element RE2, and the second rotary machine MG2 (refer to "MG2" in the drawing) is coupled to the third rotational element RE3 that rotates integrally with the intermediate transmission member 30 so that rotation of the engine 14 is transmitted to the stepped transmission unit 20 via the intermediate transmission member 30. In the continuously variable transmission unit 18, the relationship between the rotation speed of the sun gear S0 and the rotation speed of the ring gear R0 is shown by respective straight lines L0 and L0R crossing the vertical line Y2.

In the stepped transmission unit 20, the fourth rotational element RE4 is selectively coupled to the intermediate transmission member 30 via the clutch C1, the fifth rotational element RE5 is coupled to the output shaft 22, the sixth rotational element RE6 is selectively coupled to the intermediate transmission member 30 via the clutch C2 and selectively coupled to the case 16 via the brake B2, and the seventh rotational element RE7 is selectively coupled to the case 16 via the brake B1. In the stepped transmission unit 20, by respective straight lines L1, L2, L3, L4, and LR crossing the vertical line Y5 according to engagement/release controls of the engagement devices CB, the respective rotation speeds of "1st," "2nd," "3rd," "4th," and "Rev" at the output shaft 22 are shown.

The straight line L0 and the straight lines L1, L2, L3, and L4 being solid lines in FIG. 3 represent relative speeds of the respective rotational elements in forward running in a hybrid running mode enabling hybrid running using at least the engine 14 as a power source. In this hybrid running mode, in the differential mechanism 32, with respect to the engine torque Te to be input to the carrier CA0, when a reaction torque being a negative torque caused by the first rotary machine MG1 is input into the sun gear S0 in forward rotation, an engine direct torque Td ($=Te/(1+p0)=-(1/p0)\times Tg$) that becomes a positive torque in forward rotation appears in the ring gear R0. Then, in response to a requested drive force, a combined torque of the engine direct torque Td and the MG2 torque Tm is transmitted as a drive torque in a forward running direction of the vehicle 10 to the drive wheels 28 via the stepped transmission unit 20 in which any AT gear position among the AT first speed gear position to the AT fourth speed gear position is formed. At this time, the first rotary machine MG1 functions as a power generator to generate a negative torque in forward rotation. A generated electric power Wg of the first rotary machine MG1 is charged in the battery 52 or consumed by the second rotary machine MG2. The second rotary machine MG2 outputs the MG2 torque Tm by using all or a part of the generated electric power Wg or electric power from the battery 52 in addition to the generated electric power Wg.

Although not shown in FIG. 3, in the alignment chart in a motor running mode enabling motor running in which the engine 14 is stopped and the second rotary machine MG2 is used as a power source for running, in the differential mechanism 32, the carrier CA0 is set into a zero-rotation state, and the MG2 torque Tm that becomes a positive torque in forward rotation is input into the ring gear R0. At this time, the first rotary machine MG1 coupled to the sun gear S0 is set into an unloaded state and idled in negative rotation. That is, in the motor running mode, the engine 14 is not driven, and an engine rotation speed Ne being a rotation speed of the engine 14 is set to zero, and the MG2 torque Tm is transmitted as a drive torque in a forward running direction of the vehicle 10 to the drive wheels 28 via the stepped transmission unit 20 in which any AT gear position among the AT first speed gear position to the AT fourth speed gear position is formed. The MG2 torque Tm here is a power running torque of forward rotation.

The straight lines L0R and LR shown as dashed lines in FIG. 3 represent relative speeds of the respective rotational elements in backward running in the motor running mode. In this backward running in the motor running mode, the MG2 torque Tm that becomes a negative torque in negative rotation is input into the ring gear R0, and this MG2 torque Tm is transmitted as a drive torque in the backward running direction of the vehicle 10 to the drive wheels 28 via the stepped transmission unit 20 in which the AT first speed gear position is formed. In the vehicle 10, by the electronic control device 80 described later, in a state where, for example, the AT first speed gear position being a low-side AT gear position for forward running among the plurality of AT gear positions is formed, the MG2 torque Tm for backward running which becomes positive/negative reverse to the sign of the MG2 torque Tm for forward running at the time of forward running is output from the second rotary machine MG2, and accordingly, backward running is enabled. Here, the MG2 torque Tm for forward running is a power running torque that becomes a positive torque of forward rotation, and the MG2 torque Tm for backward running is a power running torque that becomes a negative torque of negative rotation. Thus, in the vehicle 10, the AT gear position for forward running is used, and the sign of the MG2 torque Tm is reversed to enable backward running. Using the AT gear position for forward running is using the same AT gear position as in forward running. In the hybrid running mode, it is also possible to make negative rotation of the second rotary machine MG2 as shown by the straight line L0R, so that backward running is possible as in the motor running mode.

In the vehicle drive device 12, the continuously variable transmission unit 18 as an electric shifting mechanism is configured which includes the differential mechanism 32 having three rotational elements of the carrier CA0 as the first rotational element RE1 to which the engine 14 is coupled in a power transmittable manner, the sun gear S0 as the second rotational element RE2 to which the first rotary machine MG1 is coupled in a power transmittable manner, and the ring gear R0 as the third rotational element RE3 to which the intermediate transmission member 30 is coupled, and in which a differential state of the differential mechanism 32 is controlled according to control of operating conditions of the first rotary machine MG1. The third rotational element RE3 to which the intermediate transmission member 30 is coupled is a third rotational element RE3 to which the second rotary machine MG2 is coupled in a power transmittable manner from another viewpoint. That is, in the vehicle drive device 12, the continuously variable transmission unit 18 is configured which includes the differential mechanism 32 to which the engine 14 is coupled in a power transmittable manner and the first rotary machine MG1 coupled to the differential mechanism 32 in a power transmittable manner, and in which a differential state of the differential mechanism 32 is controlled according to control of operating conditions of the first rotary machine MG1. The continuously variable transmission unit 18 is operated as an electric continuously variable transmission in which a transmission gear ratio $\gamma 0$ (=Ne/Nm) being a value of a ratio of an engine rotation speed Ne equivalent in value to a rotation speed of the coupling shaft 34 serving as an input rotating member and the MG2 rotation speed Nm being a rotation speed of the intermediate transmission member 30 serving as an output rotating member is changed.

For example, in the hybrid running mode, when a rotation speed of the sun gear S0 is increased or decreased according to control of the rotation speed of the first rotary machine MG1 with respect to a rotation speed of the ring gear R0 to be restricted by rotation of the drive wheels 28 in response to formation of an AT gear position in the stepped transmission unit 20, the rotation speed of the carrier CA0, that is, the engine rotation speed Ne is increased or decreased. Therefore, in hybrid running, the engine 14 can be operated at an operation point with high efficiency. That is, the stepped transmission unit 20 in which the AT gear position is formed and the continuously variable transmission unit 18 operated as a continuously variable transmission can constitute a continuously variable transmission as a whole of the composite transmission 40 in which the continuously variable transmission unit 18 and the stepped transmission unit 20 are disposed in series.

Alternatively, the continuously variable transmission unit 18 can also be made to perform shifting like a stepped transmission, and therefore, by the stepped transmission unit 20 in which an AT gear position is formed and the continuously variable transmission unit 18 made to perform shifting like a stepped transmission, the composite transmission 40 can be made to perform shifting like a stepped transmission as a whole. That is, in the composite transmission 40, the stepped transmission unit 20 and the continuously variable transmission unit 18 can be controlled so that the plurality of gear positions that are different in transmission gear ratio $\gamma t$ (=Ne/No) representing a ratio of the engine rotation speed Ne to the output rotation speed No are selectively established. In the present example, gear positions to be established by the composite transmission 40 are referred to as simulated gear positions. The transmission gear ratio $\gamma t$ is a total transmission gear ratio to be formed by the continuously variable transmission unit 18 and the stepped transmission unit 20 disposed in series, and is a value ($\gamma t = \gamma 0 \times \gamma at$) obtained by multiplying a transmission gear ratio $\gamma 0$ of the continuously variable transmission unit 18 by a transmission gear ratio $\gamma at$ of the stepped transmission unit 20.

Figures 4, 5:
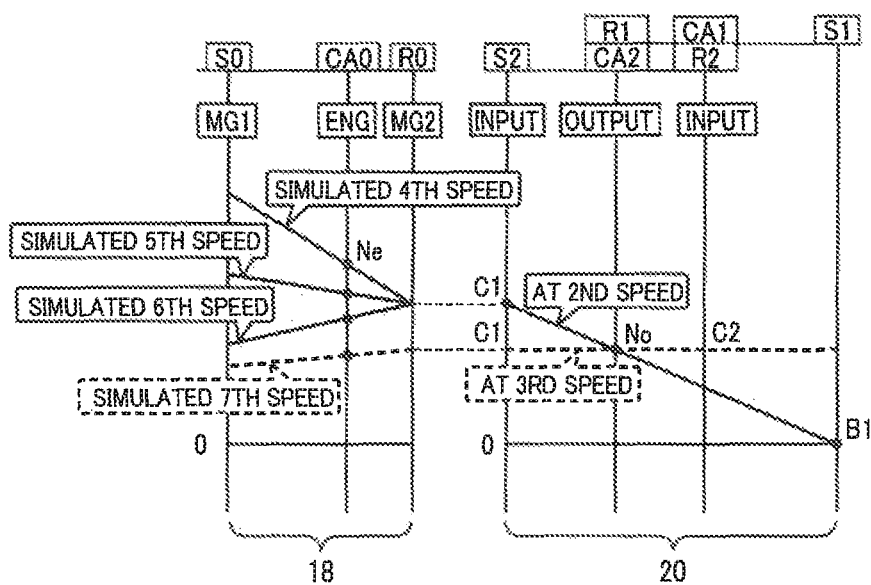
FIG. 4 is a diagram describing an example of a gear position assignment table showing assignment of a plurality of simulated gear positions to a plurality of AT gear positions.
FIG. 5 is a diagram illustrating the AT gear positions of the stepped transmission unit and the simulated gear positions of the composite transmission on the same alignment chart as in FIG. 3.

The simulated gear positions are assigned so that, for example, one or a plurality of kinds are established for each AT gear position of the stepped transmission unit 20 according to a combination of each AT gear position of the stepped transmission unit 20 and one or a plurality of kinds of transmission gear ratios $\gamma 0$ of the continuously variable transmission unit 18. For example, FIG. 4 shows an example of a gear position assignment table. In FIG. 4, simulated gear positions are determined in advance so that a simulated first speed gear position to a simulated third speed gear position are established for the AT first speed gear position, a simulated fourth speed gear position to a simulated sixth speed gear position are established for the AT second speed gear position, a simulated seventh speed gear position to a simulated ninth speed gear position are established for the AT third speed gear position, and a simulated tenth speed gear position is established for the AT fourth speed gear position.

FIG. 5 is a diagram illustrating the AT gear positions of the stepped transmission unit 20 and the simulated gear positions of the composite transmission 40 on the same alignment chart as in FIG. 3. In FIG. 5, the solid line illustrates a case where when the stepped transmission unit 20 establishes the AT second speed gear position, the simulated fourth speed gear position to the simulated sixth speed gear position are established. In the composite transmission

40, the continuously variable transmission unit 18 is controlled so that an engine rotation speed Ne that realizes a predetermined transmission gear ratio γt is reached with respect to the output rotation speed No, and accordingly, different simulated gear positions are established for a certain AT gear position. The dashed line illustrates a case where when the stepped transmission unit 20 forms the AT third speed gear position, the simulated seventh speed gear position is established. In the composite transmission 40, the continuously variable transmission unit 18 is controlled according to switching of the AT gear position, and accordingly, the simulated gear position is switched.

Referring to FIG. 1 again, the vehicle 10 includes the electronic control device 80 as a controller including control devices of the vehicle 10 relating to controls of the engine 14, the continuously variable transmission unit 18, and the stepped transmission unit 20, etc. Therefore, FIG. 1 is a diagram showing an input/output system of the electronic control device 80, and a functional block diagram describing an essential portion of control functions of the electronic control device 80. The electronic control device 80 is configured to include a so-called microcomputer with, for example, a CPU, a RAM, a ROM, and an I/O interface, etc., and the CPU executes various controls of the vehicle 10 by performing signal processing according to programs stored in advance in the ROM while utilizing a temporary memory function of the RAM. The electronic control device 80 is configured so as to be divided for engine control and shifting control, etc., as necessary.

To the electronic control device 80, various signals, etc., based on detection values (for example, an engine rotation speed Ne and a crank angle Acr representing a rotation position of the crankshaft 14c, an MG1 rotation speed Ng being a rotation speed of the first rotary machine MG1, the MG2 rotation speed Nm being the AT input rotation speed Ni, an output rotation speed No corresponding to the vehicle speed V, an accelerator opening θacc as a driver's accelerating operation amount representing a magnitude of a driver's accelerator operation, the throttle valve opening θth being an opening of an electronic throttle valve, a forward/backward acceleration G of the vehicle 10, an operation position POSsh being an operation position of a shift lever 56 as a shifting operation member equipped in the vehicle 10, and a battery temperature THbat, a battery charging/discharging current Ibat, and a battery voltage Vbat of the battery 52, and so on) detected by various sensors installed in the vehicle 10 (for example, an engine rotation speed sensor 60, an MG1 rotation speed sensor 62, an MG2 rotation speed sensor 64, an output rotation speed sensor 66, an accelerator opening sensor 68, a throttle valve opening sensor 70, a G sensor 72, a shift position sensor 74, and a battery sensor 76, etc.) are respectively supplied. A driver's accelerating operation amount showing a magnitude of a driver's accelerating operation is an accelerating operation amount being an operation amount of an accelerating operation member, for example, an accelerator pedal, etc. From the electronic control device 80, various command signals (for example, an engine control command signal Se for controlling the engine 14, rotary machine control command signals Smg for controlling the first rotary machine MG1 and the second rotary machine MG2, and hydraulic control command signals Sat for controlling operating states of the engagement devices CB, etc.) are respectively output to the respective devices installed in the vehicle 10 (for example, an engine control device 58 including a throttle actuator, a fuel injection device, and an ignition device, etc., the inverter 50, and a hydraulic control circuit 54, etc.). The hydraulic control command signals Sat are hydraulic control command signals for controlling shifting of the stepped transmission unit 20, and command signals for driving, for example, respective solenoid valves SL1 to SL4, etc., to regulate respective engagement hydraulic pressures PRcb to be supplied to the respective hydraulic actuators of the engagement devices CB. The electronic control device 80 sets hydraulic pressure instruction values corresponding to values of the respective engagement hydraulic pressures PRcb to be supplied to the respective hydraulic actuators to obtain target engagement torques Tcb of the engagement devices CB, and outputs drive currents or drive voltages corresponding to the hydraulic pressure instruction values to the hydraulic control circuit 54.

The electronic control device 80 calculates a state of charge value SOC [%] as a value showing a state of charge of the battery 52 based on, for example, the battery charging/discharging current Ibat and the battery voltage Vbat, etc. Also, the electronic control device 80 calculates chargeable and dischargeable electric powers Win and Wout regulating a usable range of battery power Pbat being power of the battery 52 based on, for example, the battery temperature THbat and the state of charge value SOC of the battery 52. The chargeable and dischargeable electric powers Win and Wout are chargeable electric power Win as power that can be input, regulating limitation on input power of the battery 52, and dischargeable electric power Wout as power that can be output, regulating limitation on output power of the battery 52. For example, the chargeable and dischargeable electric powers Win and Wout are set to be smaller as the battery temperature THbat becomes lower in a low-temperature range in which the battery temperature THbat is lower than a normal range, and set to be smaller as the battery temperature THbat becomes higher in a high-temperature range in which the battery temperature THbat is higher than the normal range. For example, the chargeable electric power Win is set to be smaller as the state of charge value SOC becomes higher in a region in which the state of charge value SOC is high. For example, the dischargeable electric power Wout is set to be smaller as the state of charge value SOC becomes lower in a region in which the state of charge value SOC is low.

To realize various controls in the vehicle 10, the electronic control device 80 includes an AT shifting control means, that is, an AT shifting control unit 82, and a hybrid control means, that is, a hybrid control unit 84.

The AT shifting control unit 82 judges shifting of the stepped transmission unit 20 by using, for example, an AT gear position shifting map showing a relationship obtained experimentally or in design and stored in advance, that is, a predetermined relationship, and executes shifting control of the stepped transmission unit 20 as necessary. In this shifting control of the stepped transmission unit 20, to automatically switch the AT gear position of the stepped transmission unit 20, the AT shifting control unit 82 outputs, to the hydraulic control circuit 54, hydraulic control command signals Sat to switch engaged/released states of the engagement devices CB by the solenoid valves SL1 to SL4. The above-described AT gear position shifting map shows a predetermined relationship, having shifting lines for judgment on shifting of the stepped transmission unit 20 on, for example, a two-dimensional coordinate system using the output rotation speed No and the accelerator opening θacc as variables. Here, the vehicle speed V or the like may be used in place of the output rotation speed No, and a requested drive torque Tdem, a throttle valve opening θth, or the like may be used in place of the accelerator opening θacc. The respective shifting lines on the AT gear position shifting map are upshifting lines for judging upshifting, and downshifting lines for judging downshifting. Each shifting line is for judging, on a line showing a certain accelerator opening θacc, whether the output rotation speed No has crossed the line, or on a line showing a certain output rotation speed No, whether the accelerator opening θacc has crossed the line, that is, judging whether a shifting point being a value at which shifting should be executed on a shifting line has been crossed, and is determined in advance as a series of shifting points.

The hybrid control unit 84 includes a function as an engine control means, that is, an engine control unit to control operation of the engine 14, and a function as a rotary machine control means, that is, a rotary machine control unit to control operations of the first rotary machine MG1 and the second rotary machine MG2 via the inverter 50, and by these control functions, executes hybrid drive control, etc., using the engine 14, the first rotary machine MG1, and the second rotary machine MG2. The hybrid control unit calculates a requested drive power Pdem by applying the accelerator opening θacc and the vehicle speed V to, for example, a drive power map showing a predetermined relationship. This requested drive power Pdem is the requested drive torque Tdem at a current vehicle speed V from another viewpoint. To realize the requested drive power Pdem, the hybrid control unit 84 outputs the engine control command signal Se being a command signal to control the engine 14, and the rotary machine control command signals Smg being command signals to control the first rotary machine MG1 and the second rotary machine MG2 in consideration of the chargeable and dischargeable electric powers Win and Wout, etc., of the battery 52. The engine control command signal Se is, for example, a command value of engine power Pe being power of the engine 14 that outputs the engine torque Te at a current engine rotation speed Ne. The rotary machine control command signals Smg are, for example, a command value of generated electric power Wg of the first rotary machine MG1 that outputs the MG1 torque Tg at the MG1 rotation speed Ng at the time of command output as a reaction torque of the engine torque Te, and a command value of electric power consumption Wm of the second rotary machine MG2 that outputs the MG2 torque Tm at the MG2 rotation speed Nm at the time of command output.

For example, when the continuously variable transmission unit 18 is operated as a continuously variable transmission and the composite transmission 40 is operated as a continuously variable transmission as a whole, considering the optimum point of the fuel consumption, to obtain the engine rotation speed Ne and the engine torque Te by which engine power Pe realizing the requested drive power Pdem is obtained, the hybrid control unit 84 changes a transmission gear ratio γ0 of the continuously variable transmission unit 18 by executing continuously variable shifting control of the continuously variable transmission unit 18 by controlling the engine 14 and controlling the generated electric power Wg of the first rotary machine MG1. As a result of this control, a transmission gear ratio γt of the composite transmission 40 when operated as a continuously variable transmission is controlled.

For example, when making the continuously variable transmission unit 18 perform shifting like a stepped transmission and making the composite transmission 40 perform shifting like a stepped transmission as a whole, the hybrid control unit 84 judges shifting of the composite transmission 40 by using, for example, a simulated gear position shifting map showing a predetermined relationship, and executes shifting control of the continuously variable transmission unit 18 so as to selectively establish the plurality of simulated gear positions in coordination with shifting control of the AT gear positions of the stepped transmission unit 20 by the AT shifting control unit 82. The plurality of simulated gear positions can be established by controlling the engine rotation speed Ne by the first rotary machine MG1 according to the output rotation speed No so as to maintain the respective transmission gear ratios γt. The transmission gear ratios γt of the respective simulated gear positions do not necessarily have to be constant values throughout the entire region of the output rotation speed No, and may be changed in a predetermined region, and may be limited according to upper limits and lower limits, etc., of rotation speeds of the respective units.

Figure 6:
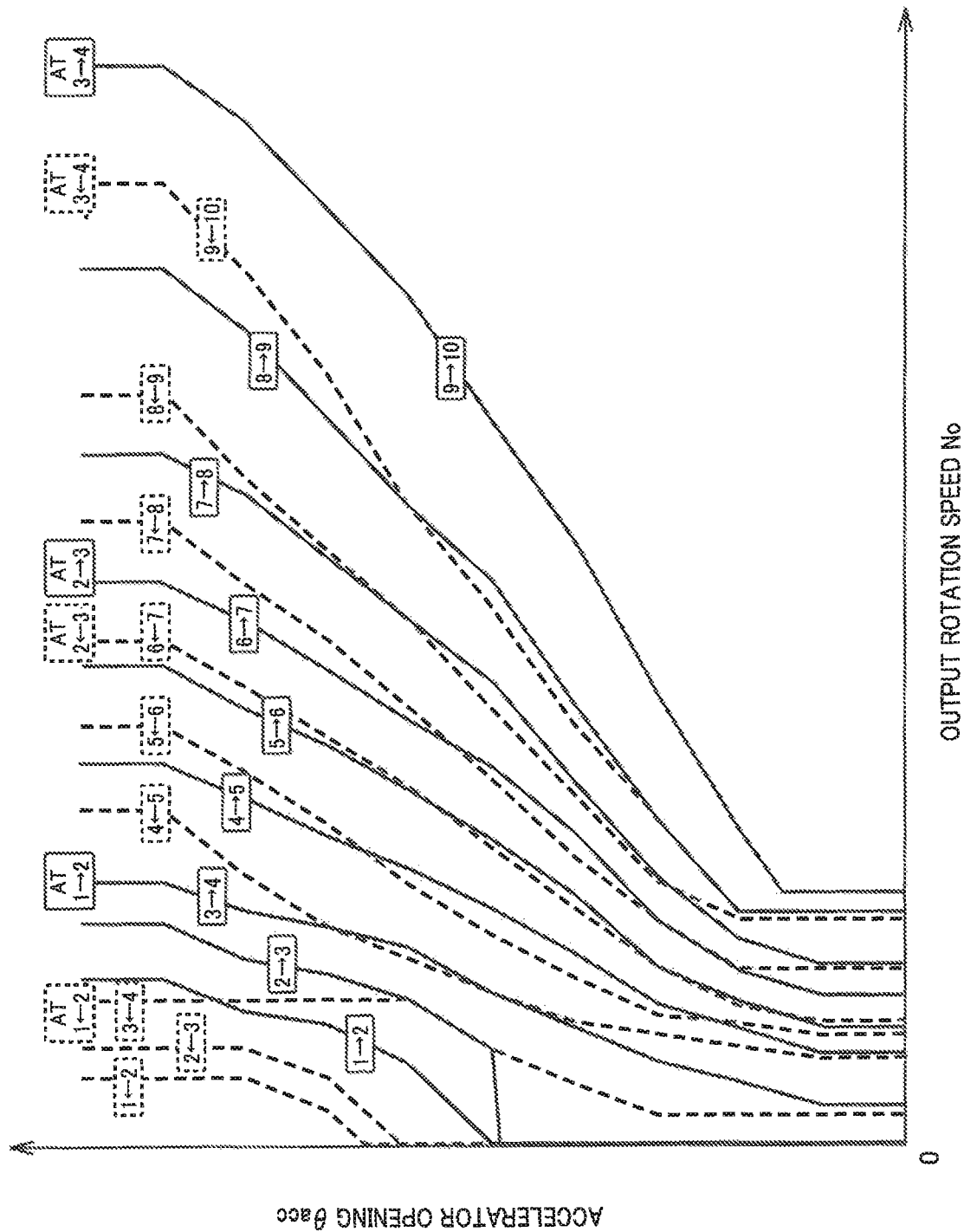
FIG. 6 is a diagram describing an example of a simulated gear position shifting map to be used for a shifting control of the plurality of simulated gear positions.

In the above-described simulated gear position shifting map, as in the AT gear position shifting map, the output rotation speed No and the accelerator opening θacc are determined in advance as parameters. FIG. 6 shows an example of the simulated gear position shifting map, and solid lines are upshifting lines, and dashed lines are downshifting lines. By switching the simulated gear position according to the simulated gear position shifting map, the same shifting feeling as that of a stepped transmission is obtained by the whole of the composite transmission 40 including the continuously variable transmission unit 18 and the stepped transmission unit 20 disposed in series. In the simulated stepped shifting control to make the composite transmission 40 perform shifting like a stepped transmission as a whole, for example, when a running mode focusing on running performance such as a sports running mode is selected by a driver or when the requested drive torque Tdem is comparatively large, the continuously variable shifting control in which the composite transmission 40 is operated as a continuously variable transmission as a whole may be just preferentially executed, however, it is also possible that simulated stepped shifting control is basically executed except for a predetermined time when execution is limited.

The simulated stepped shifting control by the hybrid control unit 84 and the shifting control of the stepped transmission unit 20 by the AT shifting control unit 82 are executed in coordination with each other. In the present example, to 4 kinds of AT gear positions of the AT first speed gear position to the AT fourth speed gear position, 10 kinds of simulated gear positions of the simulated first speed gear position to the simulated tenth speed gear position are assigned. Therefore, the AT gear position shifting map is determined so that shifting of the AT gear position is performed at the same timing as a timing of shifting of the simulated gear position. In detail, the respective "3→4", "6→7", and "9→10" upshifting lines of the simulated gear positions in FIG. 6 match the respective "1→2", "2→3", and "3→4" upshifting lines in the AT gear position shifting map (refer to "All 2", etc., in FIG. 6). The respective "3←4", "6←7", and "9←10" downshifting lines of the simulated gear positions in FIG. 6 match the respective "1←2", "2←3", and "3←4" downshifting lines in the AT gear position shifting map (refer to "AT1←2", etc., in FIG. 6). Alternatively, an AT gear position shifting command may be output to the AT shifting control unit 82 based on judgment on shifting of the simulated gear position according to the simulated gear position shifting map in FIG. 6. In this way, at the time of upshifting of the stepped transmission unit 20, upshifting of the whole composite transmission 40 is performed, and on the other hand, at the time of downshifting of the stepped transmission unit 20, downshifting of the whole composite transmission 40 is performed. The AT shifting control unit 82 switches the AT gear position of the stepped transmission unit 20 when the simulated gear position is switched. Because shifting of the AT gear position is performed at the same timing as a timing of shifting of the simulated gear position, shifting of the stepped transmission unit 20 is performed by being accompanied by a change in engine rotation speed Ne, and even when a shock in response to shifting of the stepped transmission unit 20 occurs, it hardly provides a sense of discomfort to a driver.

The hybrid control unit 84 selectively establishes, as a running mode, the motor running mode or the hybrid running mode according to a running state. For example, when the requested drive power Pdem is in a motor running region smaller than a predetermined threshold, the hybrid control unit 84 establishes the motor running mode, and on the other hand, when the requested drive power Pdem is in a hybrid running region equal to or higher than the predetermined threshold, the hybrid control unit 84 establishes the hybrid running mode. Even when the requested drive power Pdem is in the motor running region, if the state of charge value SOC of the battery 52 is less than a predetermined engine starting threshold A, the hybrid control unit 84 establishes the hybrid running mode. The motor running mode is a running state where running is performed by generating a drive torque by the second rotary machine MG2 while the engine 14 is stopped. The hybrid running mode is a running state where running is performed while the engine 14 is operated. The engine starting threshold A is a threshold determined in advance for judging a state of charge value SOC showing that the battery 52 needs to be charged by forcibly starting the engine 14.

When establishing the motor running mode, the hybrid control unit 84 stops operation of the engine 14, and enables motor running using only the second rotary machine MG2 as a power source for running by using electric power from the battery 52. In this motor running mode, the MG2 torque Tm is transmitted to the drive wheels 28 via the stepped transmission unit 20, and running with a drive torque generated by the second rotary machine MG2 is enabled. In this motor running mode as well, as in the hybrid running mode, shifting control of the stepped transmission unit 20 using the AT gear position shifting map is also executed. The AT gear position shifting map to be used in the motor running mode is determined in advance so that, for example, an AT gear position that improves efficiency of the second rotary machine MG2 is selected.

When establishing the hybrid running mode, the hybrid control unit 84 enables hybrid running in which the engine direct torque Td is transmitted to the intermediate transmission member 30 by taking charge of a reaction force to power of the engine 14 by power generation of the first rotary machine MG1 and a torque is transmitted to the drive wheels 28 by driving the second rotary machine MG2 by a generated power of the first rotary machine MG1. In this hybrid running mode, running by further adding a drive torque generated by the second rotary machine MG2 by using electric power from the battery 52 is also possible.

The hybrid control unit 84 functionally includes a starting control means, that is, a starting control unit 86 that establishes the hybrid running mode and starts the engine 14 when the vehicle state transits from the motor running region into the hybrid running region or when the state of charge value SOC becomes lower than the engine starting threshold A during stoppage of operation of the engine 14. When starting the engine 14 from the motor running mode, the starting control unit 86 starts the engine 14 by ignition when the engine rotation speed Ne becomes equal to or more than a predetermined rotation speed enabling ignition while increasing the engine rotation speed Ne by the first rotary machine MG1. That is, the starting control unit 86 starts the engine 14 by cranking the engine 14 by the first rotary machine MG1. When the hybrid control unit 84 starts the engine 14 in response to the state of charge value SOC that has become lower than the engine starting threshold A, after completing starting of the engine 14, the hybrid control unit 84 performs power generation by the first rotary machine MG1 by using power of the engine 14, and charges the generated power of the first rotary machine MG1 in the battery 52.

When cranking the engine 14 by the first rotary machine MG1, a negative torque being a torque in a direction of decreasing the rotation speed is generated in the intermediate transmission member 30, so that the drive torque drops. This negative torque generated in the intermediate transmission member 30 is a starting-time inertia torque that is generated according to starting of the engine 14 and causes the drive torque to drop in the starting process of the engine 14. This starting-time inertia torque is a torque to be generated when increasing the engine rotation speed Ne by cranking at the time of starting of the engine, that is, a torque to be generated in response to starting of the engine 14 by cranking.

When starting the engine by the first rotary machine MG1, the starting control unit 86 makes the second rotary machine MG2 output a starting-time compensation torque being a torque to compensate the drop in the drive torque occurring in the starting process of the engine 14 in addition to a running torque being a torque to generate a drive torque, necessary for meeting the requested drive torque Tdem. This starting-time compensation torque is a reaction torque to the starting-time inertia torque generated in response to starting of the engine 14.

As described above, when starting the engine by the first rotary machine MG1, the second rotary machine MG2 takes charge of a reaction force to the starting-time inertia torque. It is possible that an MG2 drive region being a torque region in which the second rotary machine MG2 is permitted to output a running torque in the motor running mode is set to be smaller by at least the starting-time compensation torque than a torque region regulated by maximum rating of the second rotary machine MG2 in preparation for engine starting by the first rotary machine MG1. In this case, a maximum drive torque that can be output in the motor running mode is decreased. On the other hand, it is also possible that a drive torque that can be output in the motor running mode is prioritized, and the MG2 drive region is set to be larger than the setting of the MG2 drive region reduced by the starting-time compensation torque. When employing this aspect in which the MG2 drive region is set to be larger than the setting of the MG2 drive region reduced by the starting-time compensation torque, at the time of engine starting by the first rotary machine MG1, the starting-time compensation torque may become insufficient and a starting shock in response to the drop in the drive torque may occur.

A magnitude of the starting-time inertia torque is considered to be influenced by a torque at the time of cranking by the first rotary machine MG1, a rotation speed change rate of the engine 14 in the starting process of the engine 14, and a compression torque corresponding to a pumping loss and a friction torque of the engine 14 such as a mechanical friction torque corresponding to a sliding resistance. In the present example, focusing on a magnitude of the starting-time inertia torque to be generated, it is proposed to suppress occurrence of the above-described starting shock in response to the drop in the drive torque. The rotation speed change rate of the engine 14 is a temporal differentiation, that is, a time change rate of the engine rotation speed Ne, and is represented as an engine rotation change rate dNe/dt.

In detail, the electronic control device 80 further includes a state determination means, that is, a state determination unit 88 to realize a control function to suppress occurrence of the above-described starting shock.

The state determination unit 88 determines whether the state of charge value SOC is lower than the engine starting threshold A. In addition, the state determination unit 88 determines whether a torque margin being a margin of the torque of the second rotary machine MG2 which can be used for the starting-time compensation torque to be output by the second rotary machine MG2 in addition to the running torque when engine starting by the first rotary machine MG1 is executed by the starting control unit 86 is equal to or more than a predetermined torque margin Ta. The state determination unit 88 calculates the torque margin by subtracting a current running torque from a predetermined rated maximum torque regulated by maximum rating of the second rotary machine MG2. The predetermined torque margin Ta is, for example, a lower limit of a torque margin of the second rotary machine MG2 determined in advance to enable outputting of the starting-time compensation torque necessary for suppressing occurrence of the starting shock.

In a case where the state determination unit 88 determines that a torque margin of the second rotary machine MG2 capable of being used for the starting-time compensation torque is equal to or more than the predetermined torque margin Ta when the state determination unit 88 determines that the state of charge value SOC is lower than the engine starting threshold A, the starting control unit 86 executes normal engine starting by starting the engine 14 by cranking of the engine 14 by the first rotary machine MG1.

In a case where the state determination unit 88 determines that a torque margin of the second rotary machine MG2 capable of being used for the starting-time compensation torque is less than the predetermined torque margin Ta when the state determination unit 88 determines that the state of charge value SOC is lower than the engine starting threshold A, the starting control unit 86 executes special engine starting different from normal engine starting. The torque margin of the second rotary machine MG2 corresponds to a reaction torque that the second rotary machine MG2 can take charge of with respect to the starting-time inertia torque. When the torque margin of the second rotary machine MG2 is less than the predetermined torque margin Ta, the reaction torque that the second rotary machine MG2 can take charge of becomes smaller. The special engine starting is engine starting to be executed in a special engine starting pattern in which the starting-time inertia torque itself becomes smaller as compared with that in a normal engine starting pattern set at the time of normal engine starting.

Figure 7:
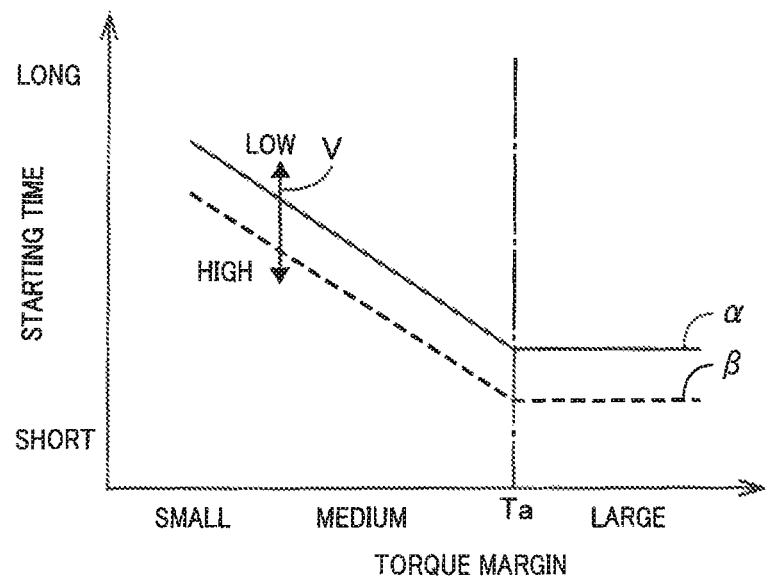
FIG. 7 shows an example of engine starting patterns different in setting of a starting time.
Figure 8:
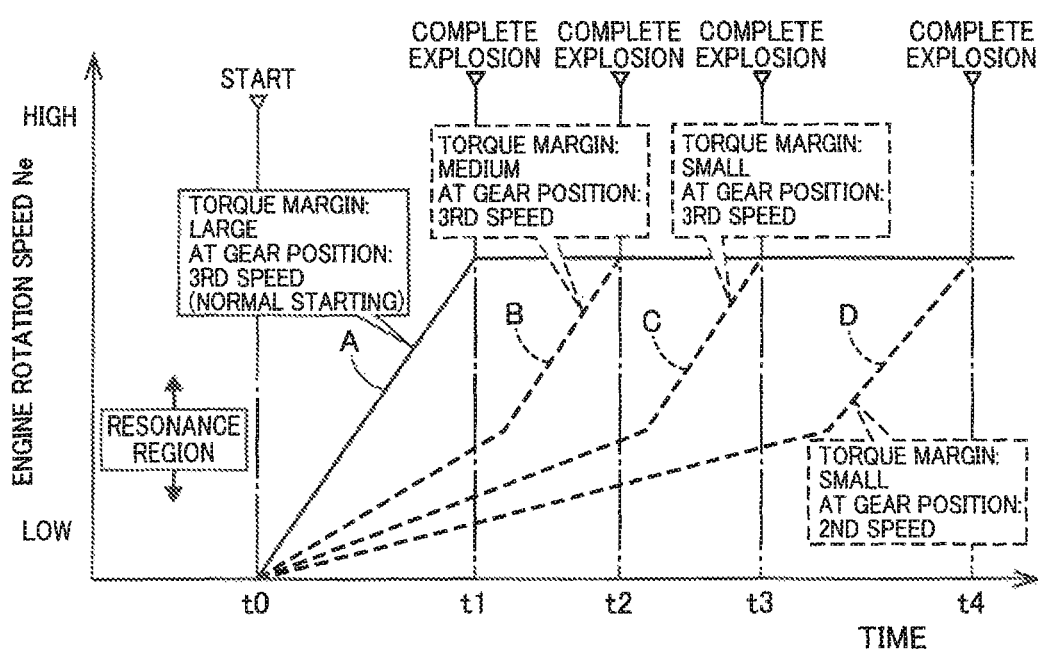
FIG. 8 shows an example of engine starting patterns different in setting of a rotation speed change rate of the engine.

FIG. 7 and FIG. 8 are diagrams respectively illustrating various engine starting patterns. FIG. 7 shows an example of engine starting patterns different in setting of a starting time. FIG. 8 shows an example of engine starting patterns different insetting of the engine rotation change rate dNe/dt.

In FIG. 7, the starting time is a time from the start of starting where cranking of the engine 14 is started to completion of starting where the engine 14 completely explodes and starting is completed. The "large" region in which the torque margin of the second rotary machine MG2 is equal to or more than the predetermined torque margin Ta shows a starting time in the normal engine starting pattern.

In the normal engine starting pattern, for example, as shown by the solid line α and the dashed line β, a uniform starting time is set. The "small" and "medium" regions in which the torque margin of the second rotary machine MG2 is less than the predetermined torque margin Ta show starting times in the special engine starting pattern. In the special engine starting pattern, as shown by, for example, the solid line α and the dashed line β, a starting time longer than in the normal engine starting pattern is set, and as the torque margin of the second rotary machine MG2 becomes smaller, a longer starting time is set. Setting a longer starting time means that the engine rotation speed Ne is slowly increased by cranking of the engine 14 by the first rotary machine MG1, and the starting-time inertia torque itself is made smaller, and the drop in the drive torque in response to the starting-time inertia torque is also made smaller. Therefore, even when the reaction torque that the second rotary machine MG2 can take charge of is small, the drop in the drive torque can be suppressed. In this way, the starting control unit 86 makes the starting-time inertia torque smaller by setting a longer starting time of the engine 14.

In FIG. 8, a solid line A, a dashed line B, a dashed line C, and a dashed line D respectively represent increase patterns in which the engine rotation speed Ne is increased toward a predetermined rotation speed that enables self-sustained operation by cranking of the engine 14 by the first rotary machine MG1, that is, increase patterns of the engine rotation speed Ne in the starting process of the engine 14. The solid line A when the torque margin of the second rotary machine MG2 becomes "large" equal to or more than the predetermined torque margin Ta represents an engine rotation change rate dNe/dt in the normal engine starting pattern with the AT third speed gear position. The dashed line B when the torque margin of the second rotary machine MG2 becomes "medium" less than the predetermined torque margin Ta represents an engine rotation change rate dNe/dt in the special engine starting pattern with the AT third speed gear position. The dashed line C when the torque margin of the second rotary machine MG2 becomes "small" less than the predetermined torque margin Ta represents an engine rotation change rate dNe/dt in the special engine starting pattern with the AT third speed gear position. The dashed line D when the torque margin of the second rotary machine MG2 becomes "small" less than the predetermined torque margin Ta represents an engine rotation change rate dNe/dt in the special engine starting pattern with the AT second speed gear position. In the normal engine starting pattern, for example, as shown by the solid line A, a comparatively large engine rotation change rate dNe/dt is set, and the engine rotation speed Ne is quickly increased. In the special engine starting pattern, as shown by, for example, the dashed line B and the dashed line C, an engine rotation change rate dNe/dt smaller than in the normal engine starting pattern is set, and as the torque margin of the second rotary machine MG2 becomes smaller, a smaller engine rotation change rate dNe/dt is set, and the increase in engine rotation speed Ne is slowed. Setting a smaller engine rotation change rate dNe/dt means slowly increasing the engine rotation speed Ne by cranking of the engine 14 by the first rotary machine MG1, and the starting-time inertia torque itself is made smaller, and a drop in the drive torque in response to the starting-time inertia torque is also made smaller. Therefore, even when a reaction torque that the second rotary machine MG2 can take charge of is small, a drop in the drive torque can be suppressed. In this way, the starting control unit 86 makes smaller the starting-time inertia torque by making smaller the engine rotation change rate dNe/dt in the starting process of the engine 14.

As described above, when switching from the motor running mode to the hybrid running mode, the starting control unit 86 starts the engine 14 so as to make small the starting-time inertia torque in response to starting of the engine 14 when the torque margin of the second rotary machine MG2 capable of being used for the starting-time compensation torque to be output in addition to the running torque by the second rotary machine MG2 is small as compared with the case where the torque margin is large.

Referring to FIG. 7 again, the solid line α shows an engine starting pattern at a comparatively low vehicle speed, and the dashed line β shows an engine starting pattern at a comparatively high vehicle speed. During running at a low vehicle speed, a starting shock is considered to be more easily felt than during running at a high vehicle speed. Therefore, a starting time of the engine 14 is set so as to become longer as the vehicle speed V becomes lower as shown by, for example, the solid line α and the dashed line β. Thus, the starting control unit 86 makes longer the starting time of the engine 14 when the vehicle speed V is lower than when the vehicle speed V is high. Making longer the starting time of the engine 14 corresponds to making smaller the engine rotation change rate dNe/dt. Therefore, the starting control unit 86 makes smaller the engine rotation change rate dNe/dt when the vehicle speed V is lower than when the vehicle speed V is high.

Referring to FIG. 8 again, in the case of the AT second speed gear position, the starting-time inertia torque to be transmitted to the drive wheels 28 via the stepped transmission unit 20 is amplified as compared with the case of the AT third speed gear position, so that a starting shock is considered to be easily increased. Therefore, the engine rotation change rate dNe/dt in the starting process of the engine 14 is set so as to become smaller as the AT gear position goes to the lower side as shown by, for example, the dashed line C and the dashed line D. In this way, the starting control unit 86 makes smaller the engine rotation change rate dNe/dt in the starting process of the engine 14 when a transmission gear ratio of the stepped transmission unit 20 is a low-side transmission gear ratio as compared with when the transmission gear ratio is a high-side transmission gear ratio.

As shown in the "resonance region" in FIG. 8, in some cases, a resonance region in which resonance in a power transmission path due to an explosion variation in engine rotation speed Ne is generated is present in a region in which the engine rotation speed Ne is lower than a predetermined rotation speed enabling self-sustained operation. In such a case, when increasing the engine rotation speed Ne, it is desirable that the engine rotation speed is made to pass through this resonance region in a time as short as possible. The "resonance region" shown in FIG. 8 is present in an engine high rotation region being a latter period of engine starting, higher than an engine low rotation region being a preceding period of engine starting. Therefore, as shown by the dashed line B, the dashed line C, and the dashed line D in FIG. 8, in the preceding period of engine starting, the engine rotation change rate dNe/dt smaller than in normal engine starting is set, however, in the latter period of engine starting, an engine rotation change rate dNe/dt equal to that in the normal engine starting pattern with the same AT gear position is set. Thus, the starting control unit 86 makes larger the engine rotation change rate dNe/dt in the starting process of the engine 14 when the engine rotation speed Ne is in the predetermined resonance region determined in advance than when the engine rotation speed Ne is in a region other than the predetermined resonance region.

In the starting process of the engine 14, in some cases, a running torque to be output by the second rotary machine MG2 is changed according to a change in requested drive torque Tdem in the motor running mode, etc. When the running torque to be output by the second rotary machine MG2 is changed, a torque margin of the second rotary machine MG2 is also changed. As in the present example, when an aspect in which the starting-time inertia torque is made smaller according to a torque margin of the second rotary machine MG2 is employed, an influence of a change in torque margin of the second rotary machine MG2 in the starting process of the engine 14 on the starting shock easily increases. Therefore, the starting control unit 86 changes, in the starting process of the engine 14, the starting-time inertia torque in response to starting of the engine 14 in accordance with a change in torque margin of the second rotary machine MG2.

Figure 9:
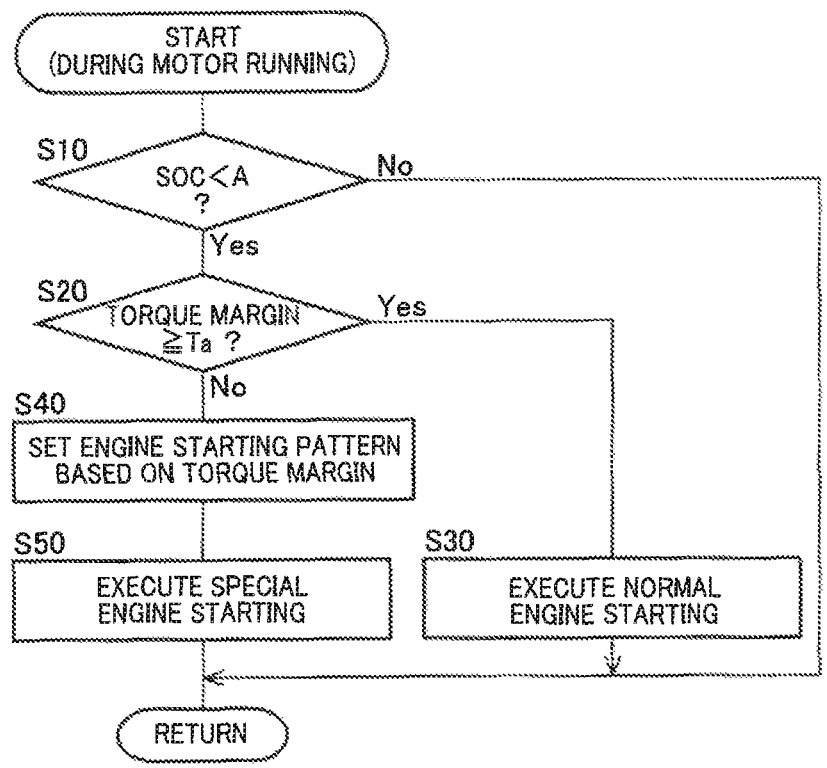
FIG. 9 is a flowchart describing an essential portion of a control operation of an electronic control device, that is, a control operation to properly reduce a starting shock when making a second rotary machine output a starting-time compensation torque in a starting process of the engine.
Figure 10:
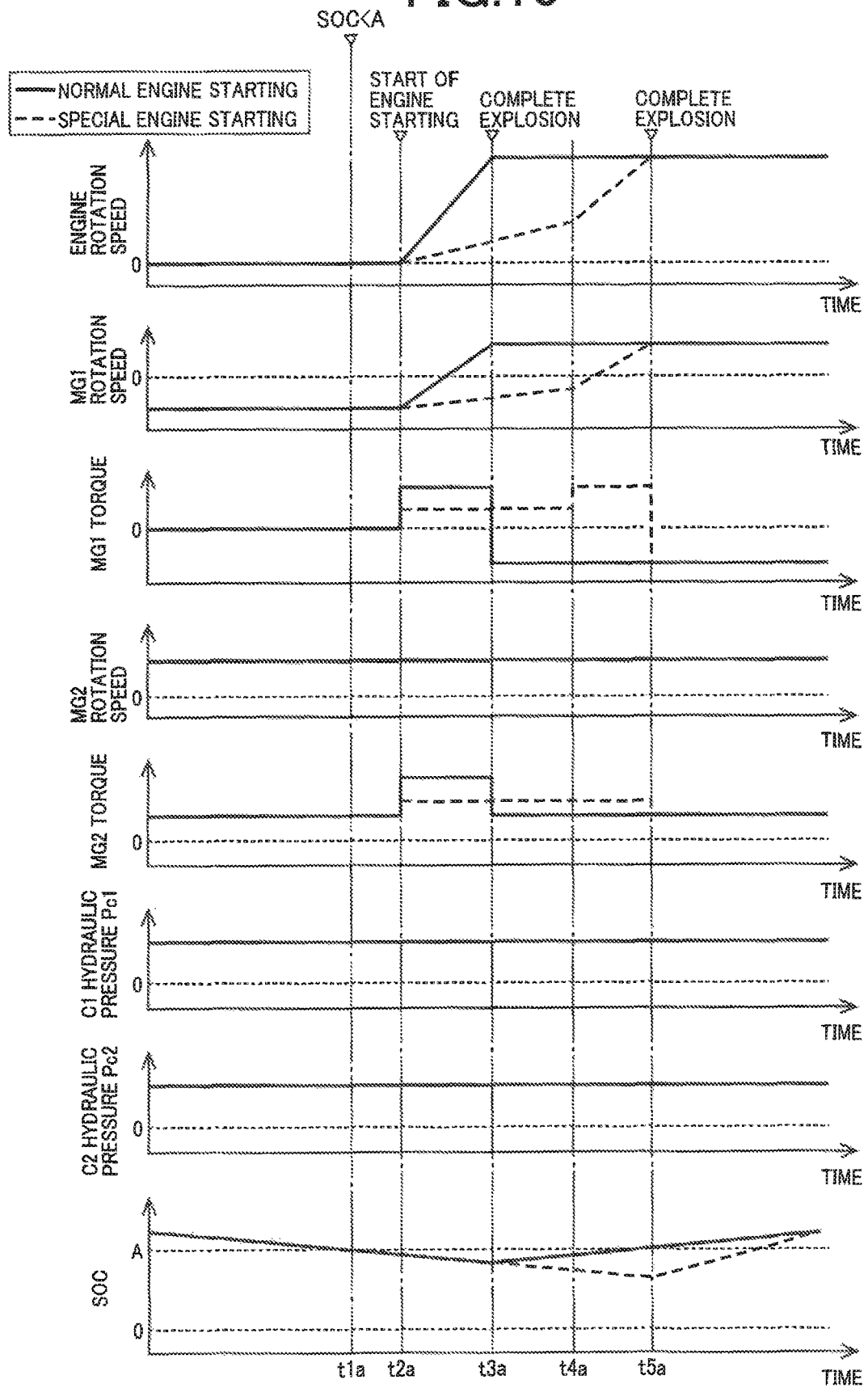
FIG. 10 is a diagram showing an example of a time chart when the control operation shown in the flowchart of FIG. 9 is executed.

FIG. 9 is a flowchart describing an essential portion of a control operation of the electronic control device 80, that is, a control operation to properly reduce a starting shock when making the second rotary machine MG2 output a starting-time compensation torque in the starting process of the engine 14, and, for example, is executed during motor running. FIG. 10 is a diagram showing an example of a time chart when the control operation shown in the flowchart of FIG. 9 is executed.

In FIG. 9, first, in Step (hereinafter, Step is omitted) S10 corresponding to a function of the state determination unit 88, whether the state of charge value SOC is lower than the engine starting threshold A is determined. When a result of this determination in S10 is negative, this routine is completed. When a result of this determination in S10 is affirmative, in S20 corresponding to a function of the state determination unit 88, it is determined whether a torque margin (=rated maximum torque−running torque) of the second rotary machine MG2 is equal to or more than a predetermined torque margin Ta. When a result of this determination in S20 is affirmative, in S30 corresponding to a function of the starting control unit 86, normal engine starting using the normal engine starting pattern is executed (refer to the solid line A in FIG. 8). When a result of the determination in S20 described above is negative, in S40 corresponding to a function of the starting control unit 86, based on a torque margin of the second rotary machine MG2, a special engine starting pattern in which the starting-time inertia torque itself is made smaller than in the normal engine starting pattern is set (refer to FIG. 7 and FIG. 8). Then, in S50 corresponding to a function of the starting control unit 86, special engine starting using the special engine starting pattern set in S40 described above is executed.

FIG. 10 shows an example of an embodiment when the state of charge value SOC decreases during motor running with the AT third speed gear position. In this embodiment, shifting of the stepped transmission unit 20 is not executed, and the AT third speed gear position is maintained. In FIG. 10, the timing t1*a* shows a timing at which the state of charge value SOC is made lower than the engine starting threshold A. The timing t2*a* shows a timing at which starting of the engine 14 is started in response to the state of charge value SOC made lower than the engine starting threshold A. In this engine starting, the engine 14 is started by ignition when the engine rotation speed Ne is made equal to or more than a predetermined rotation speed enabling ignition while the engine rotation speed Ne is increased by the first rotary machine MG1. After completion of engine starting when the engine 14 completely explodes and starting of the engine 14 is completed, generated electric power of the first rotary machine MG1 by using power of the engine 14 is charged in the battery 52 and the state of charge value SOC is increased. In this starting process of the engine 14, the second rotary machine MG2 is made to output a starting-time compensation torque in addition to a running torque. When a starting-time compensation torque is output as much as necessary, a starting shock is properly reduced. A solid line shows the case of normal engine starting where a starting-time compensation torque can be output as much as necessary even when using the normal engine starting pattern (refer to timing t2a to timing t3a). A dashed line shows the case of special engine starting in which the special engine starting pattern is used because a starting-time compensation torque becomes insufficient as compared with a necessary compensation torque when using the normal starting pattern (refer to timing t2a to timing t5a). In a preceding period of engine starting shown by the dashed line, as compared with engine starting shown by the solid line, a positive torque of the first rotary machine MG1 at the time of cranking is made smaller, and the engine rotation speed Ne is slowly increased (refer to timing t2a to timing t4a). Accordingly, the starting-time inertia torque in response to starting of the engine 14 is reduced, so that even when a reaction torque that the second rotary machine MG2 can take charge of is small, a drop in the drive torque is suppressed. In the latter period of engine starting shown by the dashed line, the MG1 torque Tg is set to be higher than in the preceding period of engine starting, and accordingly, the engine rotation change rate dNe/dt is increased, and the engine rotation speed Ne is made to quickly pass through the resonance region (refer to timing t4a to timing t5a). At this time, due to a small torque margin of the second rotary machine MG2, the MG2 torque Tm is not increased. This is disadvantageous for suppression of the starting shock, however, quick passage through the resonance region is prioritized.

As described above, according to the present example, when starting the engine 14 from the motor running mode, the engine 14 is started so as to make smaller the starting-time inertia torque in response to starting of the engine 14 when a torque margin of the second rotary machine MG2 capable of being used for the starting-time compensation torque to be output by the second rotary machine MG2 in addition to the running torque is smaller than in the case where the torque margin is large, so that when the torque margin of the second rotary machine MG2 is small, a drop in the drive torque to be caused by the starting-time inertia torque is made smaller. Accordingly, even when the torque margin of the second rotary machine MG2 is small, a drop in the drive torque can be compensated. Therefore, when the second rotary machine MG2 is made to output the starting-time compensation torque in the starting process of the engine 14, a starting shock can be properly reduced.

According to the present example, the starting-time inertia torque is made smaller by setting a longer starting time of the engine 14, so that when the torque margin of the second rotary machine MG2 is small, a drop in the drive torque to be caused by the starting-time inertia torque can be properly reduced.

According to the present example, the starting-time inertia torque is made smaller by making smaller the engine rotation change rate dNe/dt in the starting process of the engine 14, so that when the torque margin of the second rotary machine MG2 is small, a drop in the drive torque to be caused by the starting-time inertia torque is properly reduced.

According to the present example, when the engine rotation speed Ne is in the predetermined resonance region, the engine rotation change rate dNe/dt is set to be larger than when the engine rotation speed Ne is in a region other than the predetermined resonance region, so that when making the starting-time inertia torque smaller by making smaller the engine rotation change rate dNe/dt in the starting process of the engine 14, occurrence of resonance in the power transmission path due to an explosion variation in engine rotation speed Ne is avoided or suppressed.

According to the present example, when the transmission gear ratio of the stepped transmission unit 20 is a low-side transmission gear ratio, the engine rotation change rate dNe/dt is made smaller than when the transmission gear ratio is a high-side transmission gear ratio, so that in response to the phenomenon in which the starting-time inertia torque is amplified and transmitted to the drive wheels 28 as the transmission gear ratio of the stepped transmission unit 20 goes to the lower side, a drop in the drive torque to be caused by the starting-time inertia torque is properly reduced.

According to the present example, when the vehicle speed V is low, the engine rotation change rate dNe/dt is made smaller than when the vehicle speed V is high, so that as the vehicle speed V goes to the lower vehicle speed side where a starting shock is easily felt, a drop in the drive torque to be caused by the starting-time inertia torque is made smaller.

According to the present example, the starting-time inertia torque is changed in accordance with a change in torque margin of the second rotary machine MG2 in the starting process of the engine 14, so that in response to the phenomenon in which an influence of the torque margin change on the starting shock increases when an aspect in which the starting-time inertia torque is made smaller in accordance with a torque margin of the second rotary machine MG2 is employed, such an influence can be reduced.

Next, another example of the present invention is described. In the following description, portions mutually common to the examples are provided with the same reference sign, and description thereof is omitted.

Example 2

In the present example, the starting control unit 86 executes a starting method in which the engine 14 is started by ignition starting by rotating the engine 14 by combusting in a predetermined cylinder in the engine 14 stopping rotating in addition to a starting method in which the engine 14 is started by cranking the engine 14 by the first rotary machine MG1. This predetermined cylinder is a cylinder of the engine 14 stopping in, for example, an expansion stroke. That is, in the starting method of the engine 14 by ignition starting, by injecting a fuel into the cylinder of the engine 14 stopping in, for example, an expansion stroke, that is, into the cylinder in an expansion stroke of the engine 14 stopping rotating, and igniting the fuel, the fuel in the cylinder is combusted, and by a generated explosion torque, a piston is pressed down to rotate the crankshaft 14c, and accordingly, the engine 14 is started. In engine starting by ignition starting, the starting-time compensation torque is basically unnecessary. Therefore, in the present example, in a case where the starting-time compensation torque is insufficient as compared with a necessary torque when the engine 14 is cranked by the first rotary machine MG1 in normal engine starting, that is, in a case where the torque margin of the second rotary machine MG2 is smaller than the predetermined torque margin Ta, engine starting by ignition starting is executed.

In a case where the state determination unit 88 determines that a torque margin of the second rotary machine MG2, capable of being used for the starting-time compensation torque, is equal to or more than the predetermined torque margin Ta when the state determination unit 88 determines that the state of charge value SOC is lower than the engine starting threshold A, the starting control unit 86 executes normal engine starting, that is, starts the engine 14 by cranking of the engine 14 by the first rotary machine MG1 using the normal engine starting pattern. On the other hand, in a case where the state determination unit 88 determines that a torque margin of the second rotary machine MG2, capable of being used for the starting-time compensation torque, is less than the predetermined torque margin Ta when the state determination unit 88 determines that the state of charge value SOC is lower than the engine starting threshold A, the starting control unit 86 executes special engine starting to start the engine 14 mainly by ignition starting. The starting control unit 86 makes the starting-time inertia torque smaller by starting the engine 14 mainly by ignition starting.

Engine starting by ignition starting easily becomes unstable as compared with engine starting by cranking by the first rotary machine MG1. In engine starting by ignition starting, the engine torque Te is output in response to the start of starting, so that a reaction torque of the second rotary machine MG2 with respect to the starting-time inertia torque hardly becomes insufficient even when the engine rotation speed Ne is increased by the first rotary machine MG1. Therefore, when starting the engine 14 mainly by ignition starting, the starting control unit 86 may increase the engine rotation speed Ne by the first rotary machine MG1 supplementarily. In this case, the starting control unit 86 makes the second rotary machine MG2 output a starting-time compensation torque to balance out the starting-time inertia torque associated with the increase in engine rotation speed Ne by the first rotary machine MG1. At this time, when the engine torque Te decreases in the starting process of the engine 14 by, for example, ignition starting, the reaction torque of the second rotary machine MG2 may become insufficient. In this case, the starting shock may be varied by a variation in the engine torque Te in the starting process of the engine 14 by ignition starting.

Therefore, the starting control unit 86 changes the starting-time inertia torque associated with an increase in engine rotation speed Ne by the first rotary machine MG1 in accordance with a change in the engine torque Te in the starting process of the engine 14 by ignition starting.

Based on a phase difference between the crankshaft 14c and the damper 15, the starting control unit 86 detects the engine torque Te in the starting process of the engine 14 by ignition starting. In detail, the phase difference between the crankshaft 14c and the damper 15 represents a magnitude of a torsion of the damper 15, and for example, a phase difference between the crankshaft 14c and the coupling shaft 34. Therefore, in the vehicle 10, a rotation speed sensor that detects a rotation speed of the coupling shaft 34 and a rotational position of the coupling shaft 34 is provided. The starting control unit 86 calculates a magnitude of a torsion of the damper 15 based on a crank angle Acr and a rotational position of the coupling shaft 34. The starting control unit 86 calculates the engine torque Te in the starting process of the engine 14 by applying the magnitude of the torsion of the damper 15 to an engine torque map showing a predetermined relationship.

Alternatively, the starting control unit 86 calculates the engine torque Te in the starting process of the engine 14 by ignition starting based on the engine rotation change rate dNe/dt. In detail, by multiplying an inertia Ie of the engine 14 determined in advance by an engine rotation change rate dNe/dt, the starting control unit 86 calculates the engine torque Te (=Ie×dNe/dt) in the starting process of the engine 14.

Figure 11:
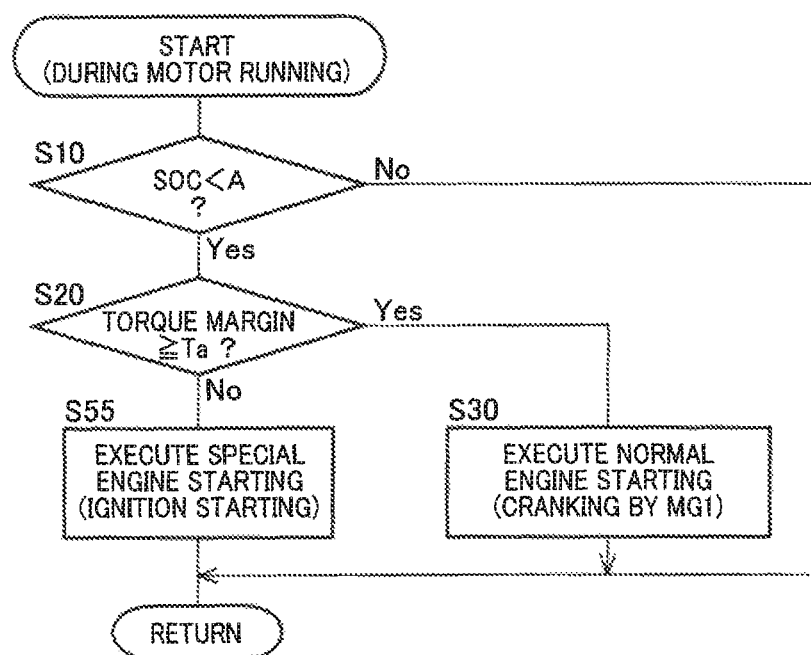
FIG. 11 is a flowchart describing an essential portion of a control operation of the electronic control device, that is, a control operation to properly reduce a starting shock when the second rotary machine is made to output a starting-time compensation torque in the starting process of the engine.
Figure 12:
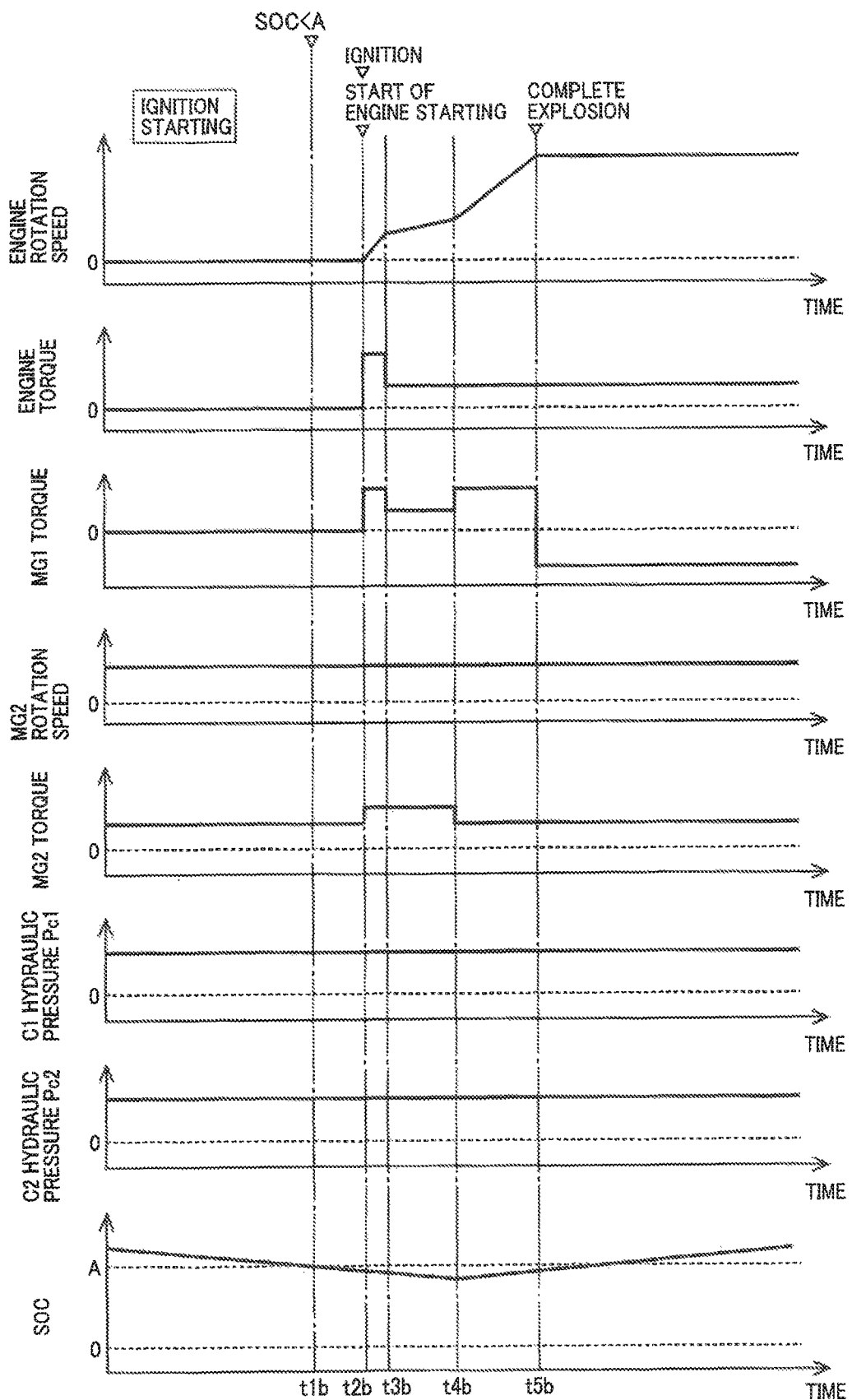
FIG. 12 is a diagram showing an example of a time chart when the control operation shown in the flowchart of FIG. 11 is executed.

FIG. 11 is a flowchart describing an essential portion of a control operation of the electronic control device 80, that is, a control operation to properly reduce a starting shock when the second rotary machine MG2 is made to output a starting-time compensation torque in the starting process of the engine 14, and the control operation is executed during, for example, motor running. FIG. 11 shows an example different from the flowchart of FIG. 9. FIG. 12 is a diagram showing an example of a time chart when the control operation shown in the flowchart of FIG. 11 is executed.

In FIG. 11, first, in S10 corresponding to a function of the state determination unit 88, whether the state of charge value SOC is lower than the engine starting threshold A is determined. When a result of this determination in S10 is negative, this routine is completed. When a result of this determination in S10 is affirmative, in S20 corresponding to a function of the state determination unit 88, whether a torque margin of the second rotary machine MG2 is equal to or more than the predetermined torque margin Ta is determined. When a result of this determination in S20 is affirmative, in S30 corresponding to a function of the starting control unit 86, normal engine starting using cranking by the first rotary machine MG1 is executed in the normal engine starting pattern. When a result of the determination in S20 described above is negative, in S55 corresponding to a function of the starting control unit 86, special engine starting mainly by ignition starting is executed.

FIG. 12 shows an example of an embodiment when the state of charge value SOC decreases during motor running with the AT third speed gear position. In this embodiment, shifting of the stepped transmission unit 20 is not performed, and the AT third speed gear position is maintained. In FIG. 12, the timing t1b shows a timing at which the state of charge value SOC is made lower than the engine starting threshold A. The timing t2b shows a timing at which starting of the engine 14 by ignition starting is started in response to the state of charge value SOC made lower than the engine starting threshold A. In this engine starting by ignition starting, the engine torque Te is output in response to the start of starting (refer to the time at and after timing t2b). Accordingly, a reaction torque of the second rotary machine MG2 with respect to the starting-time inertia torque hardly becomes insufficient, so that the engine rotation speed Ne is increased by the first rotary machine MG1 as well (refer to timing t2b to timing t3b). The second rotary machine MG2 is made to output a starting-time compensation torque to balance out a starting-time inertia torque associated with this increase. When the engine torque Te decreases in the starting process of the engine 14 by ignition starting, the reaction torque of the second rotary machine MG2 becomes insufficient. At this time, when the MG2 torque Tm cannot be increased due to a small torque margin of the second rotary machine MG2, by slowly increasing the engine rotation speed Ne by reducing the MG1 torque Tg, the starting-time inertia torque is reduced (refer to timing t3b to timing t4b). Accordingly, a drop in the drive torque is suppressed. In the latter period of engine starting, the engine rotation change rate dNe/dt is increased and the engine rotation speed Ne is made to quickly pass through the resonance region (refer to timing t4b to timing t5b).

As described above, according to the present example, the starting-time inertia torque is reduced by starting the engine 14 mainly by ignition starting, so that as in Example 1 described above, when making the second rotary machine MG2 output the starting-time compensation torque in the starting process of the engine 14, a starting shock can be properly reduced.

According to the present example, the starting-time inertia torque is changed according to a change in the engine torque Te in the starting process of the engine 14 by ignition starting, so that in response to the phenomenon in which the starting shock is varied according to a variation in the engine torque Te in the starting process of the engine 14 by ignition starting, the starting shock can be properly reduced.

According to the present example, the engine torque Te is detected based on a phase difference between the crankshaft 14c and the damper 15, so that a variation in the engine torque Te in the starting process of the engine 14 by ignition starting is properly detected, and a starting shock can be properly reduced.

According to the present example, the engine torque Te is detected based on the engine rotation change rate dNe/dt, so that a variation in the engine torque Te in the starting process of the engine 14 by ignition starting is properly detected, and a starting shock can be properly reduced.

Example 3

Figure 13:
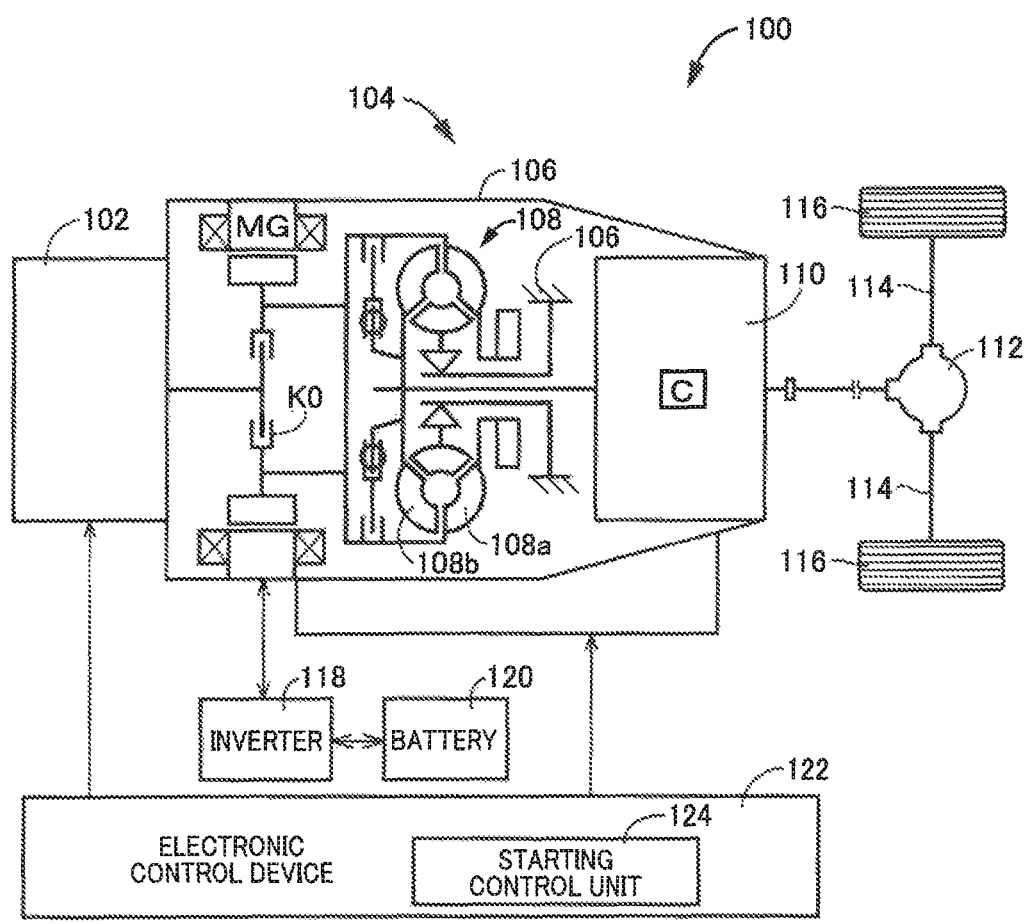
FIG. 13 is a diagram describing a schematic configuration of a power transmission device installed in a hybrid vehicle to which the present invention is applied, and which is a hybrid vehicle different from one shown in FIG. 1.

The present example illustrates a hybrid vehicle 100 as shown in FIG. 13, different from the vehicle 10 including the continuously variable transmission unit 18 and the stepped transmission unit disposed in series shown in Example 1 described above.

Hereinafter, the hybrid vehicle 100 is referred to as a vehicle 100.

In FIG. 13, the vehicle 100 includes an engine 102, a rotary machine MG, and a power transmission device 104. The engine 102 and the rotary machine MG respectively function as power sources for running of the vehicle 100, coupled to drive wheels 116 in a power transmittable manner. The power transmission device 104 includes, inside a case 106 as a non-rotatable member to be attached to a vehicle body, in order from the engine 102 side, a clutch K0, a torque converter 108, and an automatic transmission 110, etc. In addition, the power transmission device 104 includes a differential gear device 112, axles 114, etc. A pump impeller 108a of the torque converter 108 is coupled to the engine 102 via the clutch K0, and directly coupled to the rotary machine MG. A turbine wheel 108b of the torque converter 108 is directly coupled to the automatic transmission 110. In the power transmission device 104, power of the engine 102 and/or power of the rotary machine MG are transmitted to the drive wheels 116 of the vehicle 100 via the clutch K0, the torque converter 108, the automatic transmission 110, the differential gear device 112, and the axles 114, etc., in order. However, power transmission via the clutch K0 is performed when transmitting power of the engine 102.

The clutch K0 is a hydraulic frictional engagement device that connects and disconnects a power transmission path between the engine 102 and the drive wheels 116. The automatic transmission 110 is a transmission constituting a part of a power transmission path between the clutch K0 and the drive wheels 116, and is, like the stepped transmission unit 20 shown in Example 1 described above a mechanical shifting mechanism, and is a publicly-known planetary gear type automatic transmission in which any of a plurality of gear positions is formed by engagement of any engagement devices among a plurality of engagement devices C. The vehicle 100 includes an inverter 118, a battery 120 as an electric storage device that provides and receives electric power to and from the rotary machine MG via the inverter 118, and an electronic control device 122.

The electronic control device 122 enables motor running using only the rotary machine MG as a power source for running by using electric power from the battery 120 in a state where the clutch K0 is released and operation of the engine 102 is stopped. The electronic control device 122 enables hybrid running using the engine 102 as a power source for running by operating the engine 102 in a state where the clutch K0 is engaged. In the hybrid running mode enabling hybrid running, the electronic control device 122 can enable running by further adding a drive torque generated by the rotary machine MG by using electric power from the battery 120, or generate electric power in the rotary machine MG by power of the engine 102 and store the generated electric power of the rotary machine MG in the battery 120. The rotary machine MG is a rotary electric machine having a function as an electric motor and a function as a power generator, and is a so-called motor generator. An output torque (power running torque or regenerative torque) of the rotary machine MG is controlled according to control of the inverter 118 by the electronic control device 122.

The electronic control device 122 has functions equivalent to the respective functions of the AT shifting control unit 82, the hybrid control unit 84, the starting control unit 86, and the state determination unit 88 provided in the electronic control device 80 in Example 1 described above.

A starting control unit 124 that the electronic control device 122 functionally includes starts the engine 102 by igniting when the engine rotation speed Ne reaches a predetermined rotation speed or more that enables ignition while increasing the engine rotation speed Ne by controlling the clutch K0 in a released state into an engaged state. That is, the starting control unit 124 starts the engine 102 by cranking the engine 102 by switching the clutch K0 into an engaged state. In this starting method, a torque corresponding to a torque capacity in the engaging process of the clutch K0 is transmitted from the rotary machine MG side to the engine 102 side. The torque to be transmitted from the rotary machine MG side to the engine 102 side in the starting process of the engine 102 corresponds to an MG torque Tm that flows to the engine 102 side via the clutch K0. Therefore, the MG torque Tm that flows to the drive wheels 116 side is reduced by the torque that flows to the engine 102 side. In response to this, in this starting method, to suppress a drop in the drive torque that occurs in the starting process of the engine 102, in addition to a running torque necessary for meeting the requested drive torque Tdem, the electronic control device 122 makes the rotary machine MG output a torque corresponding to the torque that flows to the engine 102 side. Therefore, it can be regarded that the engine 102 is cranked by the rotary machine MG. A torque corresponding to the above-described torque that flows to the engine 102 side corresponds to the starting-time compensation torque in Example 1 described above. If the torque corresponding to the torque that flows to the engine 102 side becomes insufficient when starting the engine 102, a starting shock in response to the drop in the drive torque may occur.

Like the electronic control device 80, the electronic control device 122 can realize a control function to suppress occurrence of a starting shock in response to the drop in the drive torque.

According to the present example, the same effect as in Example 1 described above is obtained.

Examples of the present invention are described in detail above, and the present invention is also applied to other aspects.

For example, in the example described above, the vehicle 10 may be a so-called plug-in hybrid vehicle in which the battery 52 can be charged from an external power supply such as, for example, a plug-in station and a household power supply. In this case, the vehicle 10 has a predetermined first running mode in which the engine 14 is frequently started, and a predetermined second running mode in which the engine 14 is less frequently started. The first running mode is a running mode in which the motor running mode and the hybrid running mode are switched during running so as to maintain the state of charge value SOC in a predetermined range because of, for example, a certain degree of drop in the state of charge value SOC. The second running mode is a running mode in which the motor running mode is mainly used during running while the state of charge value SOC is decreased because, for example, the state of charge value SOC is sufficiently high. In running with high frequency of starting the engine 14, it is considered preferable to suppress a starting shock in response to a drop in the drive torque. Therefore, during running in the first running mode, the starting control unit 86 sets the engine rotation change rate dNe/dt in the starting process of the engine 14 to be smaller than during running in the second running mode. Accordingly, a driver's feeling of strangeness/sense of discomfort due to the high frequency of occurrence of the starting shock can be prevented or suppressed. Such an embodiment can also be applied to the vehicle 100.

In the examples described above, the second rotary machine MG2 of the vehicle 10 is only required to be coupled to the power transmission path between the continuously variable transmission unit 18 and the drive wheels 28 in a power transmittable manner. The rotary machine MG of the vehicle 100 is only required to be coupled to the power transmission path between the clutch K0 and the drive wheels 116 in a power transmittable manner. In this case, the present invention can also be applied.

In Examples 1 and 2 described above, the vehicle 10 is a vehicle including the continuously variable transmission unit 18 and the stepped transmission unit 20 disposed in series, however, the vehicle is not limited to this aspect. For example, the vehicle 10 may be a vehicle that does not include the stepped transmission unit 20 but includes the continuously variable transmission unit 18. That is, the present invention can be applied to any vehicle as long as it includes an engine and a rotary machine that are coupled to drive wheels in a power transmittable manner. In a vehicle that does not include a transmission constituting a part of a power transmission path between an engine and drive wheels, the invention in which an engine rotation change rate is made smaller when a transmission gear ratio of the transmission is a low-side transmission gear ratio than when the transmission gear ratio is a high-side transmission gear ratio cannot be applied.

In Examples 1 and 2 described above, the continuously variable transmission unit 18 may be a shifting mechanism in which differential action is limited by, for example, control of a clutch or brake coupled to a rotational element of the differential mechanism. 32. The differential mechanism. 32 may be a double pinion type planetary gear drive. The differential mechanism 32 may be a differential mechanism including four or more rotational elements by coupling a plurality of planetary gear drives to each other. The differential mechanism 32 may be a differential gear device including a pinion to be driven to rotate by the engine 14 and a pair of bevel gears which mesh with the pinion and to which the first rotary machine MG1 and the intermediate transmission member 30 are respectively coupled. The differential mechanism 32 may be a mechanism in which, in a configuration including two or more planetary gear drives coupled to each other by rotational elements constituting parts of the planetary gear drives, an engine, a rotary machine, and drive wheels are respectively coupled to the rotational elements of the planetary gear drives in a power transmittable manner.

In Example 2 described above, ignition starting is executed for a cylinder in an expansion stroke, however, it is not limited to this aspect. For example, the predetermined cylinder to be combusted first does not necessarily have to be a cylinder in an expansion stroke.

In the vehicle 100 in Example 3 described above, the torque converter 108 is used as a fluid type transmission device, however, another fluid type transmission device such as a fluid coupling having no torque amplifying effect may also be used. The torque converter 108 does not necessarily have to be provided, or may be replaced with just a clutch.

In the example described above, the stepped transmission unit 20 of the vehicle 10 may be an automatic transmission such as a synchromesh type parallel biaxial automatic transmission, a publicly-known DCT (Dual Clutch Transmission) that is a synchromesh type parallel biaxial automatic transmission and includes two systems of input shafts, or a publicly-known mechanical continuously variable transmission enabling stepless shifting such as a belt type continuously variable transmission. The same applies to the automatic transmission 110 of the vehicle 100.

In Examples 1 and 2 described above, an embodiment in which 10 kinds of simulated gear positions are assigned to four kinds of AT gear positions is illustrated, however, the present invention is not limited to this embodiment. Preferably, the number of simulated gear positions is only required to be equal to or larger than the number of AT gear positions, and may be equal to the number of AT gear positions, but desirably larger than the number of AT gear positions, and properly, for example, twice or more. Shifting of the AT gear position is performed so that rotation speeds of the intermediate transmission member 30 and the second rotary machine MG2 coupled to the intermediate transmission member 30 are maintained in a predetermined rotation speed range, and shifting of the simulated gear position is performed so that the engine rotation speed Ne is maintained in a predetermined rotation speed range, and the numbers of these gear positions are properly determined.

What has been described above is only an embodiment, and the present invention can be practiced based on the knowledge of a person skilled in the art in various aspects to which various modifications or improvements are added.

REFERENCE SIGNS LIST

10: hybrid vehicle
14: engine
14c: crankshaft (rotary shaft)
15: damper
18: electric continuously variable transmission unit (electric shifting mechanism)

20: mechanical stepped transmission unit (transmission, mechanical shifting mechanism)
28: drive wheel
32: differential mechanism
80: electronic control device
MG1: first rotary machine
MG2: second rotary machine (rotary machine)
100: hybrid vehicle
102: engine
110: automatic transmission (transmission)
116: drive wheel
122: electronic control device
K0: clutch
MG: rotary machine

The invention claimed is:

1. A hybrid vehicle with an engine and a rotary machine each coupled to a drive wheel in a power transmittable manner, comprising:
an electronic control device that makes the rotary machine output a starting-time compensation torque to compensate a drop in a drive torque caused in a starting process of the engine in addition to a running torque when the engine is started while the vehicle is in a running state in which the drive torque is generated by the rotary machine and the engine is in a stopped state, wherein
the electronic control device starts the engine such that a starting-time inertia torque that is generated according to starting of the engine and causes the drop in the drive torque is made smaller in a case where a torque margin of the rotary machine which is applied to the starting-time compensation torque is relatively small than in a case where the torque margin is relatively large.

2. The hybrid vehicle according to claim 1, wherein the electronic control device makes the starting-time inertia torque smaller by making longer a time from the start of starting of the engine to completion of starting.

3. The hybrid vehicle according to claim 1, wherein the electronic control device makes smaller the starting-time inertia torque by making smaller a rotation speed change rate of the engine in a starting process of the engine.

4. The hybrid vehicle according to claim 3, wherein the electronic control device makes larger the rotation speed change rate of the engine when a rotation speed of the engine is in a predetermined resonance region than when the rotation speed of the engine is in a region other than the predetermined resonance region.

5. The hybrid vehicle according to claim 3, further comprising:
a transmission constituting a part of a power transmission path between the engine and the drive wheel, wherein
the electronic control device makes smaller the rotation speed change rate of the engine when a transmission gear ratio of the transmission is relatively large than when the transmission gear ratio is relatively small.

6. The hybrid vehicle according to claim 3, wherein the electronic control device makes smaller the rotation speed change rate of the engine when a vehicle speed is relatively low than when the vehicle speed is relatively high.

7. The hybrid vehicle according to claim 3, wherein the electronic control device makes smaller the rotation speed change rate of the engine during running in a predetermined first running mode in which a frequency of starting the engine is relatively high than during running in a predetermined second running mode in which the frequency of starting the engine is relatively low.

8. The hybrid vehicle according to claim 1, wherein the electronic control device changes the starting-time inertia torque according to a change in the torque margin of the rotary machine in a starting process of the engine.

9. The hybrid vehicle according to claim 1, wherein
the electronic control device starts the engine by ignition starting in which the engine is rotated by combusting in a predetermined cylinder while the engine is stopping rotating, and
the electronic control device changes the starting-time inertia torque according to a change in an output torque of the engine in a starting process of the engine by the ignition starting.

10. The hybrid vehicle according to claim 9, further comprising:
a damper coupled to a rotary shaft of the engine, wherein
the electronic control device detects an output torque of the engine based on a phase difference between the rotary shaft of the engine and the damper.

11. The hybrid vehicle according to claim 9, wherein the electronic control device detects the output torque of the engine based on a rotation speed change rate of the engine.

12. The hybrid vehicle according to claim 1, further comprising:
an electric shifting mechanism including a differential mechanism to which the engine is coupled in a power transmittable manner and a first rotary machine coupled to the differential mechanism in a power transmittable manner, wherein a differential state of the differential mechanism is controlled according to control of an operating condition of the first rotary machine, and wherein
the rotary machine is a second rotary machine coupled to a power transmission path between the electric shifting mechanism and the drive wheel in a power transmittable manner, and
the electronic control device starts the engine by increasing a rotation speed of the engine by the first rotary machine.

13. The hybrid vehicle according to claim 5, further comprising:
an electric shifting mechanism including a differential mechanism to which the engine is coupled in a power transmittable manner and a first rotary machine coupled to the differential mechanism in a power transmittable manner, wherein a differential state of the differential mechanism is controlled according to control of an operating condition of the first rotary machine, and wherein
the rotary machine is a second rotary machine coupled to a power transmission path between the electric shifting mechanism and the drive wheel in a power transmittable manner,
the transmission is a mechanical shifting mechanism constituting a part of a power transmission path between the electric shifting mechanism and the drive wheel, and
the electronic control device starts the engine by increasing a rotation speed of the engine by the first rotary machine.

14. The hybrid vehicle according to claim 9, further comprising:
an electric shifting mechanism including a differential mechanism to which the engine is coupled in a power transmittable manner and a first rotary machine coupled to the differential mechanism in a power transmittable manner, wherein a differential state of the differential mechanism is controlled according to control of an operating condition of the first rotary machine, and wherein the rotary machine is a second rotary machine coupled to a power transmission path between the electric shifting mechanism and the drive wheel in a power transmittable manner, the electronic control device is configured to start the engine by increasing a rotation speed of the engine by the first rotary machine, and the electronic control device makes smaller the starting-time inertia torque by starting the engine mainly by the ignition starting.

15. The hybrid vehicle according to claim 1, further comprising:

a clutch that connects and disconnects a power transmission path between the engine and the drive wheel; and a transmission constituting apart of a power transmission path between the clutch and the drive wheel, wherein the rotary machine is coupled to the power transmission path between the clutch and the drive wheel in a power transmittable manner, and the electronic control device starts the engine by increasing a rotation speed of the engine by controlling the clutch in a released state into an engaged state.

* * * * *